(12) United States Patent
Epshteyn et al.

(10) Patent No.: US 8,753,418 B2
(45) Date of Patent: Jun. 17, 2014

(54) SONOCHEMICALLY MEDIATED PREPARATION OF NANOPOWDERS OF REACTIVE METALS

(75) Inventors: Albert Epshteyn, College Park, MD (US); Andrew P Purdy, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 440 days.

(21) Appl. No.: 12/813,911

(22) Filed: Jun. 11, 2010

(65) Prior Publication Data

US 2010/0314008 A1    Dec. 16, 2010

Related U.S. Application Data

(60) Provisional application No. 61/186,451, filed on Jun. 12, 2009.

(51) Int. Cl.
*B22F 1/00* (2006.01)
*B22F 9/00* (2006.01)
*C22B 34/00* (2006.01)
*C22C 45/00* (2006.01)

(52) U.S. Cl.
USPC ............ 75/345; 75/615; 148/403; 148/513; 977/777

(58) Field of Classification Search
CPC .......... B22F 9/007; B22F 9/24; C01B 31/305
USPC ............ 75/345, 615; 148/403, 513; 977/777
See application file for complete search history.

(56) References Cited

U.S. PATENT DOCUMENTS 4,874,475 A * 10/1989 McLaughlin et al. .......... 203/51
H1170 H    4/1993 Purdy
2008/0264205 A1* 10/2008 Zeng et al. ...................... 75/352
2008/0295645 A1* 12/2008 Halalay et al. .................. 75/345

FOREIGN PATENT DOCUMENTS

WO    WO 2006113719 A2 * 10/2006    ............... B01J 19/10

OTHER PUBLICATIONS

Barraud, E. et al., J. Alloys Compnd. 2008, 456, 224.
Berry, A. D. et al. Journal of Materials Chemistry 2003, 13, 2388-2393.
Dlott, D. Mater. Sci. Tech. 2006, 22, 463.
Epshteyn, A. M. et al., Surface passivated air and moisture stable mixed zirconium—aluminum hydride nanoparticles, Materials Research Society Symposium Proceedings 2007, 1056, 1056-H03-16.
Furstner, A. Angew. Chem. Int. Ed. Engl. 1993, 32, 164.
Ghosh, D. et al., Chem. Mater. 2008, 20, 1248.
Haber, J. A. et al., J. Am. Chem. Soc. 1998, 120, 10847.
Hirotsu, M. et al. J. Am. Chem. Soc., 2007, 129, 12690.
Horst, C. et al., Chem. Eng. Sci. 1999, 54, 2849.

(Continued)

*Primary Examiner* — Keith Walker
*Assistant Examiner* — Alexander Polyansky
(74) *Attorney, Agent, or Firm* — US Naval Research Laboratory; Roy Roberts

(57) ABSTRACT

A nanopowder and a method of making are disclosed. The nanopowder may be in the form of nanoparticles with an average size of less than about 200 nm and contain a reactive transition metal, such as hafnium, zirconium, or titanium. The nanopowder can be formed in a liquid under sonication by reducing a halide of the transition metal.

18 Claims, 21 Drawing Sheets

(56) References Cited

OTHER PUBLICATIONS

Hu, et al., Preparation and Formation Mechanism of Alumina Hollow Nanospheres via High-Speed Jet Flame Combustion, Ind. Eng. Chem. Res., 2007, pp. 8004-8008, vol. 46, Washington, D.C.

Jameel, I. et al. Thermochim. Acta 1985, 86, 163.

Johnson, et al., Preparation of Nanometer Sized Aluminum Powders, Mater. Res. Soc. Symp. Proc., 1997, pp. 131-135, vol. 457, China Lake, California.

Kwon, Y. et al., Appl. Surf. Sci. 2007, 253, 5558.

Li, W.; et al., . J. Am. Chem. Soc. 2007, 129, 6710.

Ohki, Y. et al. Angew. Chem. Int. Ed. 2007, 46, 3180.

Panish, M. B. et al. J of Chem. Phys. 1963, 38, 253.

Prozorov, T. et al., J. Am. Chem. Soc. 2004, 126, 13890.

Purdy, et al., Aluminum Nanoparticle Synthesis by Reduction of Halides with Na/K, Mater. Res. Soc. Symp. Proc., 2008, vol. 1056.

Purdy, et al., Aluminum nanoparticle synthesis using alakali metal reducing agents, American Chemical Society Fall meeting presentation slides, 2008, Washington D.C.

Purdy, et al., Aluminum nanoparticle synthesis using alkali metal reducing agents, American Chemical Society Fall meeting poster, 2008, Washington, D.C.

Reike, R. "Use of activated metals in organic and organometallic synthesis." Topics in Current Chemistry (1975) 59:1-31.

Rieke, R. D. et al., Syn. React. Inorg. Met. Org. Chem. 1974, 4, 101.

Vasquez, Y et al., J. Solid State Chem. 2008, 181, 1509.

Wang, et al., "A Novel Technique for Synthesizing Nanoshell Hollow Alumina Particles," Journal of the American Ceramic Society, Oct. 2008, pp. S32-S37, vol. 92, Issue 51, United States of America.

Yen, B. K. J. Alloys and Compounds 1998, 268, 266.

* cited by examiner

SONOCHEMICALLY MEDIATED PREPARATION OF NANOPOWDERS OF REACTIVE METALS

This application claims the benefit of U.S. Provisional Application Ser. No. 61/186,451, filed Jun. 12, 2009, entitled SONOCHEMICALLY MEDIATED PREPARATION OF AIR-RESISTANT SUBCARBIDE AND SUBHYDRIDE NANOPOWDERS OF HAFNIUM, ZIRCONIUM, OR TITANIUM, the disclosure of which is incorporated herein by reference in its entirety.

CROSS-REFERENCE TO RELATED APPLICATIONS

Cross-reference is made to U.S. patent application Ser. No. 12/323,617, filed Nov. 26, 2008, entitled METAL HYDRIDE NANOPARTICLES, by Epshteyn, et al., the disclosure of which is incorporated herein by reference, in its entirety.

BACKGROUND

The exemplary embodiment relates to a method for preparing nanopowders of reactive metals and their hydrides and carbides.

Metal powders which include very small particles have a variety of uses. Currently, materials used for metalizing of energetic formulations are micron-scale aluminum particles. Problems associated with the burn properties of the traditional metal additives in energetic formulations often relate to the burn kinetics/speed being impeded by the metal oxide coating of the particles, which arises naturally from the materials being exposed to air. Passivated nanoscale aluminum-based materials have been explored for use in energetic formulations on an experimental basis.

Another application for metal powders is in the field of energetics where metal powders are pressed into reactive projectiles that will self-ignite on impact with the target, purely from the kinetic energy of the impact. Currently mixtures of aluminum particles and Teflon™ are used for this purpose. The use of hafnium nanoparticles, for example, for underwater energetic applications would be of particular advantage due to the potential of developing high-density materials (Hf has a density of 13.3) that would have great momentum for high-speed underwater penetration. The volumetric combustion energy of Hf is as great as aluminum, and the high density would give a projectile more penetrating power. However, air stable nanoparticles of Hf have proved difficult to produce.

Large-scale production of reactive metal nanoparticles or nanopowders is of interest for applications in powder metallurgy, energetic materials, hydrogen storage materials, tribology, nanocomposites, and ceramics. (Haber, J. A.; Buhro, W. E. *J. Am. Chem. Soc.* 1998, 120, 10847; Kwon, Y.; Gromov, A. A.; Strokove, J. I. *Appl. Surf. Sci.* 2007, 253, 5558; Dlott, D. D. *Mater. Sci. Tech.* 2006, 22, 463; Li, W.; Li, C.; Ma, H.; Chen, J. *J. Am. Chem. Soc.* 2007, 129, 6710; and Vasquez, Y; Henkes, A. E.; Bauer, J. C.; Schaak, R. E. *J. Solid State Chem.* 2008, 181, 1509) Rieke originally pioneered alkali metal reduction of various metal salts in solution, but focused on the catalytic activity of various metals in the finely divided state (Furstner, A. *Angew. Chem. Int. Ed. Engl.* 1993, 32, 164; Rieke, R. D.; Burns, T. P.; Wehmeyer, R. M.; in High Energy Processes in Organometallic Chemistry (Ed.: K. S. Suslick), ACS Symposium Series 1987, 333, 223; Rieke, R. D.; Chao, L. *Syn. React. Inorg. Met. Org. Chem.* 1974, 4, 101). Disclosed herein is a method suited to bulk production of nanopowders. One popular technique for production of reactive nanopowders is reactive ball-milling. (Barraud, E.; Bégin-Colin, S.; Le Caër, G.; Barres, O., Villeras, F. *J. Alloys Compnd.* 2008, 456, 224; Yen, B. K. *J. Alloys and Compounds* 1998, 268, 266).

Vasquez et al. (Vasquez, Y; Henkes, A. E.; Bauer, J. C.; Schaak, R. E. *Journal of Solid State Chemistry* 2008, 181, 1509-1523) describes the potential of making various metal nanoparticles by low energy solution based methods. Due to air-sensitivity and therefore difficulty in handling, reactive metal nanoparticles (RMNPs) have not been extensively studied, and remain as one of the significant challenges in nanoscience. To date there has only been one reported synthesis of Ti nanoparticles via a solution-phase reduction method. (see Ghosh, D.; Pradhan, S.; Chen, W.; Chen, S., *Chemistry of Materials* 2008, 20(4), 1248-1250).

Berry has produced Zr nanoparticles by reduction of $ZrI_4$ with LiH with reaction times of weeks followed by annealing up to 600° C. (Berry, A. D.; Stroud, R. M.; Sutto, T. E. Synthesis and characterization of a nanophase zirconium powder. *Journal of Materials Chemistry* 2003, 13, 2388-2393, hereinafter Berry 2003). The reaction was very slow, however.

BRIEF DESCRIPTION

In one aspect, a method of producing nanoparticles includes reducing a halide of a transition metal with a reductant in a liquid while sonically agitated to form nanoparticles.

In another aspect, nanoparticles having an average size of less than 20 nm and comprising a metal selected from titanium, zirconium and hafnium, and combinations thereof are provided. The metal is at a concentration of at least 30 mol %. The nanoparticles are predominantly amorphous, as initially isolated from the reaction.

DETAILED DESCRIPTION

Figure 1:
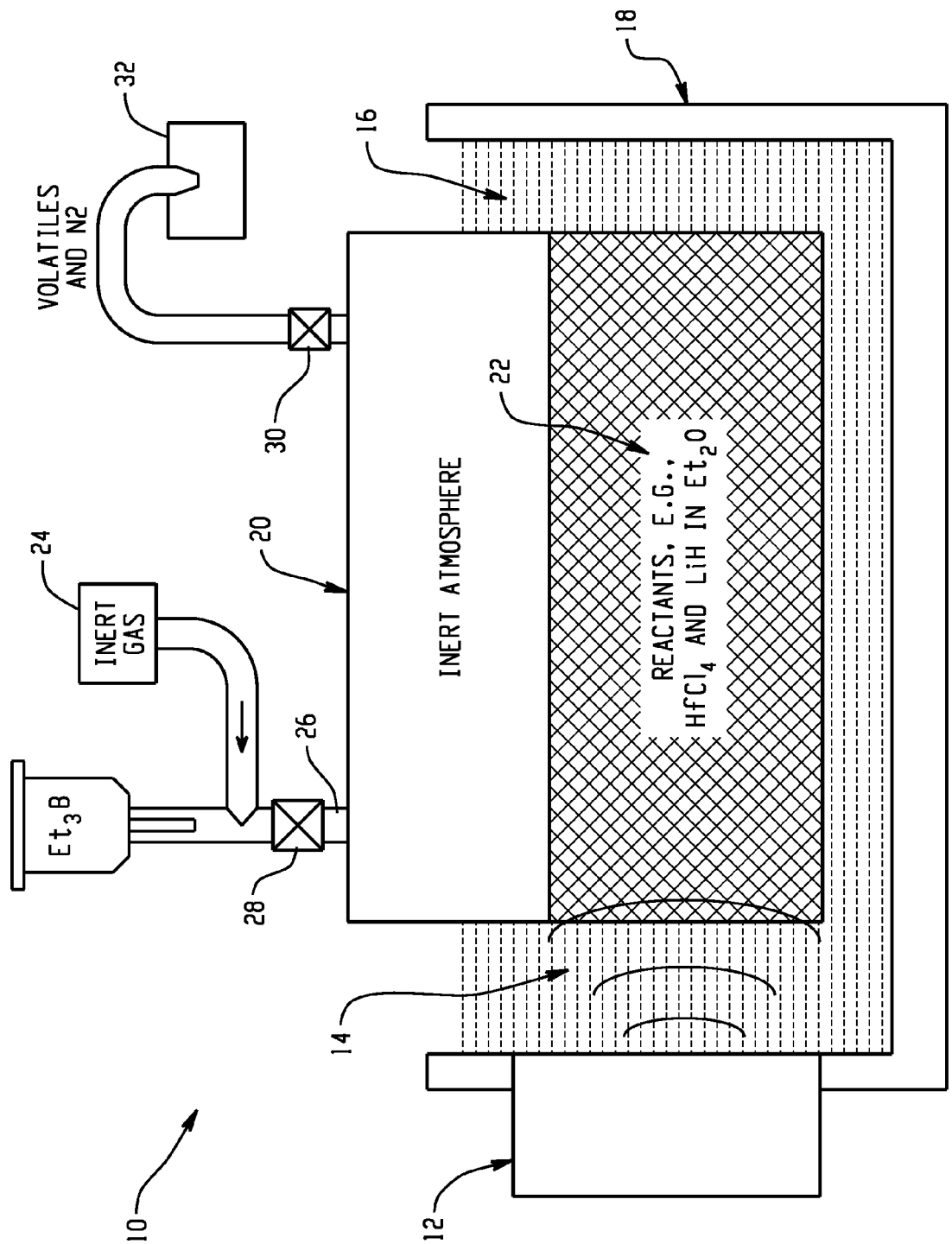
FIG. 1 is a schematic diagram illustrating an apparatus for performing the exemplary method.

Nanopowders comprising nanoparticles with high concentrations of reactive metals with high volumetric combustion energies which are stable in air are disclosed herein as well as solution-based methods for their production. While particular reference is made to hafnium as the reactive metal, it is to be appreciated that other reactive metals from group IVB of the periodic table as well as other transition metals and metal mixtures comprising them are also contemplated.

Briefly, the method of forming the nanoparticles includes reducing a halide of a transition metal with a reductant in a liquid comprising a solvent while sonicating the liquid. The resulting highly amorphous nanoparticles may then be annealed. In some embodiments, the nanoparticles are treated to remove residual reactants. In some cases, they may be exposed to hydrogen gas at temperatures above 200° C. to increase hydride content of the nanoparticles, while decreasing final carbide content.

While the solution based methods described herein for forming the amorphous nanoparticles are implemented in a laboratory scale apparatus, it is to be appreciated that larger scale synthesis of air and moisture sensitive metal nanoparticles is readily implemented. Using the exemplary methods, these materials can be produced on industrial scale using ultrasound reactors and existing heat-management systems.

As used herein, a nanopowder is a powder substantially comprised (e.g., >90% by weight) of nanoparticles. The nanoparticles forming the powder may have an average particle size (diameter or average dimension, if not spherical) of no greater than 200 nm (i.e., at least 50 wt % of the particles have a diameter of less than 500 nm). For example, the nanopowder may have an average particle size of no greater than 100 nm, and in one embodiment up to 50 nanometers, and in another embodiment up to 20 nm, e.g., about 10 nm or less. In one embodiment, the average particle size is less than 5 nm. The particles can predominantly range in size from about 1 nm to about 200 nm. For example, in one embodiment, less than 10 wt % of the particles have a particle size of less than 1 nm and less than 1 wt % of the particles have a particle size of greater than 200 nm. In some embodiments, at least 90 wt % of the particles forming the nanopowder may have a particle size of less than 20 nm. In some embodiments, the average particle size can be selectably controlled by selection of the reaction conditions, as described in greater detail below.

The exemplary nanopowder comprises the reactive metal in the form of a metal, metal hydride, metal carbide, or combination thereof. The hydride/carbide may be stoichiometric or non-stoichiometric (i.e., have less than the stoichiometric amount of carbon/hydrogen). Such non-stoichiometric forms may be referred to herein as subhydrides and subcarbides. Exemplary nanopowder materials include Ti, Zr, and Hf metal, carbides, subcarbides, hydrides, subhydrides, and combinations thereof. Examples include Ti$_2$C, Ti$_2$C$_x$, Zr$_2$C, Zr$_2$C$_x$Hf$_2$C, TiH, TiH$_x$, ZrH, ZrH$_x$HfH, HfH$_x$, TiCH, TiCH$_x$, TiC$_x$H, TiC$_x$H$_x$, ZrCH, ZrCH$_x$, ZrC$_x$H, ZrC$_x$H$_x$, HfCH, HfCH$_x$HfC$_x$H, HfC$_x$H$_x$, Hf$_2$C, Hf$_2$C$_x$ nanoparticle materials, and combinations thereof, where x indicates non-stoichiometric products, such as sub-hydrides and sub-carbides. The proportions of subhydride and are affected by the solvent selected, power of sonication, annealing of the nanopowder, and optional treatment with hydrogen gas.

The nanopowder may comprise at least 80% by weight of metal, metal hydrides, metal carbides, or combination thereof.

As used herein, a reactive metal is one which readily oxidizes/reacts with air or water. The reactive metal can be selected from group IVB metals, in particular, titanium (Ti), zirconium (Zr), hafnium (Hf) and alloys and combinations thereof. Other reactive metals selected from transition elements (in particular, those in groups IIB, VB and lanthanoids, e.g., Scandium, Yttrium, Vanadium, Niobium, Tantalum, and elements 57-71 and 89-103) are also contemplated. In one embodiment, the reactive metal comprises at least one of Hf, Zr, and Ti. While particular reference is made herein to Hf, Zr, Ti, and combinations thereof as being the reactive metal, it is to be appreciated that halides of other reactive metals and metals which are not as reactive, such as aluminum (Al), may be used. In one embodiment, Hf, Zr, and/or Ti may constitute at least 30 mol. % or at least 50 mol % of the metal in the nanoparticles and in one embodiment, at least 90 mol. % or about 99.9 mol. %. Other alloy and intermetallic nanopowders may also be produced by co-reduction of group IVB halides and other metal halides. The nanoparticles may comprise at least 30 mol % transition metal, e.g., selected from Hf, Zr, Ti, and combinations thereof.

Various methods are contemplated for forming the amorphous nanopowders. In general, a salt of the reactive metal, in particular, a halide of the reactive metal, e.g., in powdered form, is reduced under sonochemical conditions in the presence of a reducing agent, a solvent, and optionally a catalyst. The reaction takes place in an inert atmosphere.

The exemplary nanopowders are formed under sonochemical conditions. By sonochemical, it is meant that the materials are formed in a liquid which is sonically agitated by the application of sonic energy to the liquid. The sonic energy can be just below the ultrasonic range or within the ultrasonic range. For example, the sonic energy can have a frequency in the range of 15 KHz to 200 MHz, such as 20 to 50 KHz e.g., about 40 KHz. The frequency can be modulated. The sound waves have sufficient power to cause cavitation and bulk agitation of the liquid. The rated power of the sonic energy producing device may be selected according to a desired reaction temperature and reaction vessel size. For example, devices producing up to 500 W, or more may be used, although lower power devices are also effective, such as in the range of about 120 W. The sonication may be used throughout the reaction or for only a part of the reaction. Specifically, some of the reactions described herein do not need sonication to initiate the reaction (such as the reaction of lithium metal with hafnium chloride in ether), but in this case, the sonication enables completion of the reaction. The reactive metal halide and reductant can be present in the sonicated liquid either in solution or as a slurry. Sonication is used to enhance the reaction rate, as sonication can increase reaction rates for liquid-solid and solid-solid reactions in a slurry due to cavitation-induced fluid jets and high speed particle-particle collisions, also giving an added benefit of smaller and more monodisperse product powders. Other agitation methods, such as conventional mixers and stirrers, may also be employed.

In the exemplary embodiment, a low energy (~40 kHz) ultrasound-mediated synthetic process is used. Ultrasound greatly accelerates the exemplary reduction reactions and makes them practical. It also enables the preparation of unique materials. The uniqueness of the materials isolated has to do with kinetic trapping of kinetic products that can then be heat-treated (annealed) at various temperatures and durations to access a wide variety of crystalline states that cannot be manufactured in any other way, which possess unique physical properties. These materials can serve as fundamental building blocks for many novel nanocomposite materials.

While particular reference is made to the halide starting material being a chloride, it is to be appreciated that the halide can be selected from chloride, fluoride, bromide, iodide, and combinations thereof. For example, use of $HfCl_4$ in place of $HfI_4$ gives the exemplary sonochemical process a cost advantage.

The reducing agent (reductant) can be an alkali metal (group IA of the periodic table, e.g., Li, Na, K, Rb, or Cs), alkaline earth metal (group IIA of the periodic table, e.g., Mg, Ca, Sr, or Ba), a hydride of an alkali metal or alkaline earth metal, or a combination thereof. As specific examples, lithium powder, lithium hydride, Na/K alloy, Mg, and combinations thereof may be employed.

The reduction reaction can take place in an organic solvent such an ether, an alkane, toluene, or combination thereof. Exemplary solvents include saturated hydrocarbons, such as C4-C20 alkanes, e.g., pentane and heptane; aromatics, optionally with one or more alkyl substituents, such as toluene (PhMe), xylene, and ethyl benzene; ethers, such as dialkyl ethers, e.g., diethyl ether ($Et_2O$), glyme ethers (more than one ether functionality in the molecule), such as diglyme, triglyme, and tetraglyme, amines, such as alkyl amines, e.g., triethyl amine, and hexamethylene tetramine (HMTA), and combinations thereof. In some embodiments, the solvent may react with the metal halide to produce a carbide in the product. The proportion of carbide in the resulting nanoparticles can be controlled, to some extent, by the power applied in sonically agitating the reaction mixture. Where the reaction product is desired to be free of oxide or nitride forms of the reactive metal, solvents containing nitrogen or oxygen are avoided. Molten inorganic salt solvents can also be used, such as lithium chloride, sodium chloride, potassium chloride, eutectics, and combinations thereof.

The reduction reaction may take place in the presence of a catalyst, such as triethylborane ($Et_3B$). $Et_3B$ significantly increases the rate of reaction of $HfCl_4$ with LiH in $Et_2O$, for example, enabling the use of the chloride instead of the iodide as a viable starting material. $Et_3B$ is believed to induce in situ formation of $LiEt_3BH$ (an ether-soluble LiH equivalent).

The reduction reaction takes place in the absence of oxygen, e.g., in the presence of an inert gas from group 0 of the periodic table, e.g., argon, or a relatively inert gas, such as dinitrogen ($N_2$), or a combination thereof. Hf and other early transition metals are known to be capable of activating dinitrogen when in a reduced state. Conducting the reduction reaction of $HfCl_4$ with LiH in the presence of $Et_3B$ under an $N_2$ atmosphere does not produce significant nitride impurities in the product nanopowder, while in the absence of the $Et_3B$, the products show significantly greater N content (e.g., as high as 0.20%). This suggests that the $Et_3B$ likely serves as part of a reactive intermediate (such as $LiBEt_3H$) that prevents dinitrogen activation by providing an alternative lower energy pathway for the reduction.

The order of addition of reactants can be varied. For example, the metal halide and reducing agent may be combined in powder form and then the solvent added. In other embodiments, the metal halide and reducing agent may be separately combined with solvent and the two then mixed. The contact of the metal halide with the solvent, in some case, such as ether, results in solvation of the metal halide which can result in considerable generation of heat. Thus, the metal halide may be combined with the solvent before adding the reductant. Where a catalyst is used, this may be added at the start of the reaction or later, after initial reaction has taken place.

In some cases, the reducing agent may be present in excess and the excess removed following reaction, e.g., in the case of LiH.

The reactants may be heated and/or cooled during the reaction depending on the exothermic nature of the reaction. The reaction may take place from about 10° C. to about 70° C., or higher, depending on the solvents used. Reactions may run, for example at about 40-55° C. Where a water bath is used as the sonicator, the temperature is limited to temperature of the water, i.e., below 100° C. Ice may be added to the water bath to cool the reaction temperature down, if desired. When a sonic horn is used as the source of the ultrasound, the reaction temperature could be higher than 100° C.

After reaction, filtration and/or vacuum suction may be used to remove the residual solvent.

The filtered nanopowder-containing material may be heated under vacuum to remove hydrogen and residual solvent, e.g., at a temperature of at least 100° C., e.g., 200-300° C.

In some embodiments, the amorphous reaction product produced by the reduction reaction may be annealed under vacuum or flowing gas to a temperature which is less than the melting point of the reaction product, e.g., from about one third to two thirds of the decomposition temperature. Temperatures of from about 600° C. to 1100° C. may be used with the exemplary Hf, Ti, and Zr-based amorphous reaction products during annealing. At around 600° C., residual lithium is sublimed off. Annealing at even higher temperatures (600° C.-1050° C.) can be used to convert at least part of the amorphous material to crystalline material and may drive off some of the hydrogen/carbide. In one embodiment, the maximum temperature used in the annealing is at least 700° C. or at least 800° C.

In other embodiments, the reductant is removed by washing with liquid solvents, solvating the byproduct while unreactive to form the nanopowder. Then, the nanopowder need not be heated to such high temperatures.

In some cases the nanoparticles may be subject to heating in hydrogen gas, e.g., at a temperature of about 200° C.-1000° C., to increase the hydride concentration, and/or remove residual carbon. The reaction can also be effective at lower temperatures, e.g., up to 350° C.

In some cases, the nanopowder may be derivatized in its amorphous form, e.g., by heating in a reactive gas, such as nitrogen or oxygen.

The nanopowders described herein are reasonably air stable and only age slightly if kept in a moist oxygenated atmosphere. To obtain materials that do not oxidize when handled in air while still retaining their properties, the surface of the nanoparticles can be protected by a passivating agent. For example, in the case of the exemplary group IVB nanoparticle materials, the surface may be passivated with oxide and/or alkoxide moieties bound to the particle surface. Carbohydrates may be used, thereby introducing an alkoxide. Other passivation methods are disclosed in application Ser. No. 12/323,617. For some products, such as hafnium subcarbide subhydride, passivation is not necessary. The resulting nanopowder material may be stored under inert gas although short exposures to oxygen generally results in little reaction.

The nanopowders formed in the reaction (before and/or after annealing), may be characterized by various methods, including X-ray diffraction (XRD), transmission electron microscopy (TEM), elemental analysis, Thermogravimetric Analysis Mass Spectrometry (TGA-MS), Magic Angle Spinning Nuclear Magnetic Resonance (MAS NMR), and surface area/porosity according to the Brunauer, Emmett and Teller (BET) method using nitrogen gas, along with the single point approximation BET. Analysis of the volatile byproducts of annealing may also be performed.

The nanopowder which is the reaction product of the sonochemical treatment is a predominantly amorphous material, prior to heating to temperatures over about 600° C. By predominantly amorphous, it is meant that crystalline regions of greater than 1 nm in size, as determined by TEM examination of sections through the nanopowder comprise less than 10% of the nanopowder and in general, less than 1%.

FIG. 1 illustrates an exemplary apparatus 10 for forming the amorphous nanopowders described herein. The apparatus includes an ultrasound generator 12, which supplies sound waves 14, generally above 20 KHZ, to water or an aqueous solution 16 in a water bath 18. A reaction vessel 20 containing reactants 22 is positioned in the water bath to sonicate the reactants. The water bath may be cooled to maintain a reaction temperature of about room temperature up to about 50° C. In the exemplary embodiment, the reaction takes place under an inert gas, such as argon, to avoid air oxidation of the reaction products. A source of inert gas 24 is connected to an inlet 26 of the reaction vessel to supply the inert gas to create an inert atmosphere in the vessel. The inlet may be closed with a valve 28 to maintain the inert atmosphere during transportation. A pressure release valve 30 allows release of flowing inert gas and excess pressure due to the formation of volatile reaction byproducts, such as hydrogen. The volatiles may be collected in a cold trap 32 for analysis. The reaction may be continued for one to ten days, or until the expected color of the reaction products is observed.

By using sonication, group IV metal chloride salts, which contain significantly higher fractions of metal than conventional starting materials, but which are normally much less reactive to reduction with LiH, can be used to produce the exemplary nanopowders. The reaction can be effected at close to room temperature, and the reaction times are reasonable—on the order of a day or two, rather than weeks, in the case of prior methods.

Exemplary reaction schemes for 1) alkali metal and 2) alkali metal hydride reduction are now described.

1. Alkali Metal Reduction

In one method, a halide of the reactive metal $MCl_4$ (where M is Hf, Zr, Ti, or combination thereof) is reduced with a group I metal such as lithium, sodium, potassium or combination thereof. Either Li powder or liquid sodium-potassium alloy (Na/K) may be used as the reducing agent. The reducing agent is sonicated with $MCl_4$ in an organic solvent, such an ether, phenol, toluene, pentane, heptane, hexane, triethylamine, or combination thereof. The resulting solid product of that reduction, which is an amorphous powder, can be annealed at a temperature of at least about 500° C., or at least 600° C., e.g., 900-1050° C. under vacuum or substantially oxygen free atmosphere. This converts the amorphous powder to nanoparticles of $MC_x$ or M (e.g., $HfC_x$ or Hf metal) where x can be from 0.1-4, and in some cases to sublime out the salts as an alternative to washing with protic solvents. The identity and particle size of the products is a function of the solvent used and the temperatures at which the product is annealed. For example for $HfCl_4$, performing alkali metal reductions in ether with Li powder produces mixtures of substoichiometric $HfC_x$ and Hf metal. Reductions in saturated hydrocarbons as the solvent produce mostly Hf metal. The crystallographic phase and particle size are dependent on the annealing temperature. Reductions in toluene and triethylamine produce $MC_x$, and $MC_xN_y$, respectively, e.g., $HfC_x$. For example, the particle sizes can be a few nm for $HfC_x$ annealed at 950° C. (e.g., less than 5 nm), 5-10 nm for low temp (600° C.) annealed hexagonal Hf, and larger particle sizes (e.g., averaging 10-20 nm) for material heated to a high enough temperature to convert it to alpha-Hf. The air sensitivity of the annealed products varies depending on how they were made and with their composition. $HfC_x$ made with Na/K reductant contains a small amount of Na and is the most air sensitive. Alpha-Hf nanopowders are not sensitive to water, but spontaneously combust in air when initiated with the slightest spark.

Figure 2:
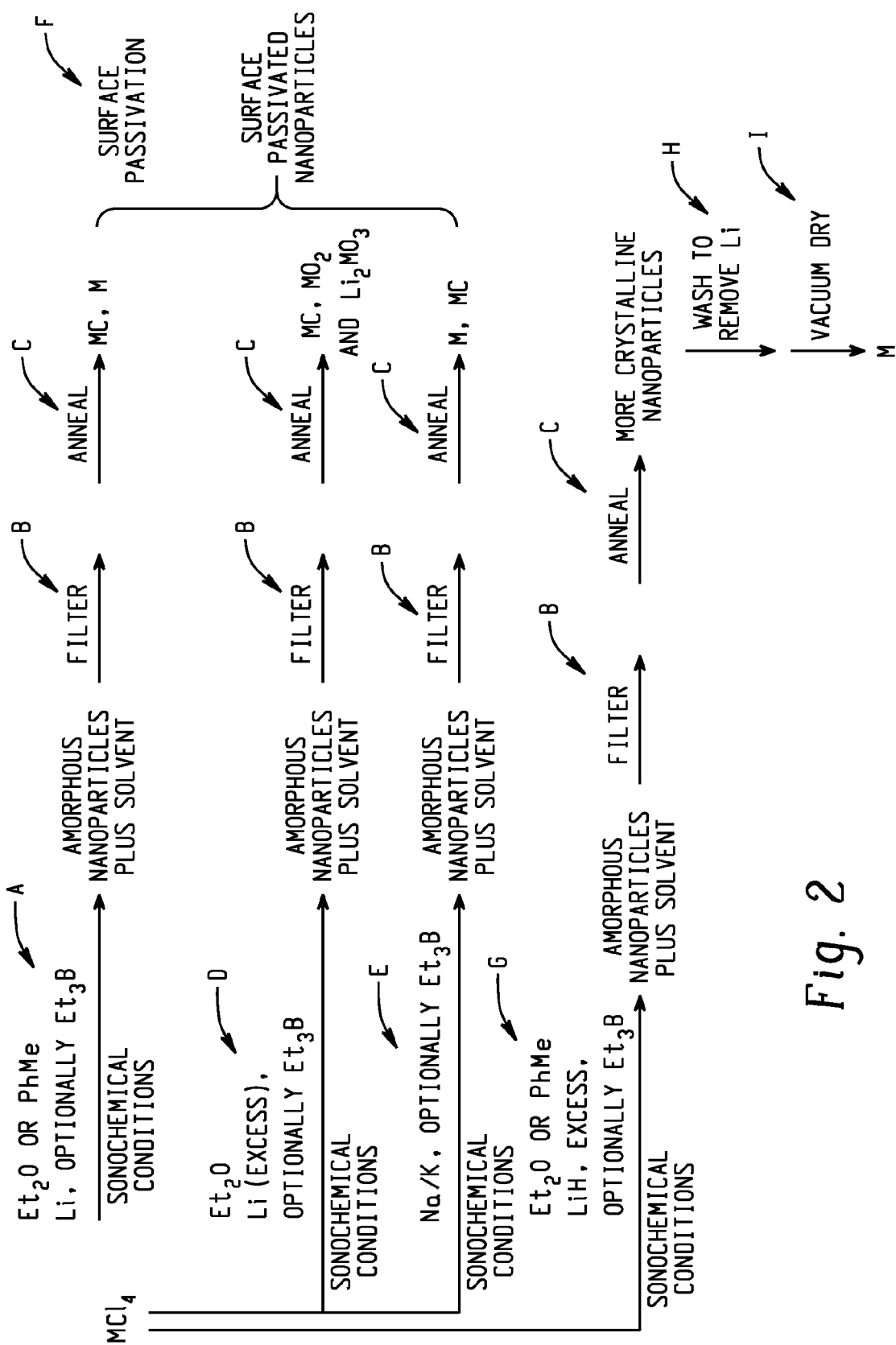
FIG. 2 illustrates exemplary reaction schemes.

FIG. 2 shows an exemplary reaction scheme.

In step A, hafnium tetrachloride is reduced with Li powder, or Na/K in either $Et_2O$ or PhMe under sonochemical conditions (e.g., ultrasound produced by a benchtop ultrasonic cleaning bath 18). The resulting black powder is isolated by filtration in step B and annealed in step C. The annealing may take place in a refractory metal tube, such as a 316 SS tube at 900-1050° C. under vacuum. The salts sublime during the annealing and the non-volatile residue is converted mostly to HfC, with crystallite sizes <3 nm as determined by X-ray diffraction (XRD). Without being bound by any particular theory, it appears that C—H bond activation during the reduction produces solvent activation products with Hf, which are then thermally converted to carbide.

In another example, reduction of $HfCl_4$ with excess Li in $Et_2O$ (step D) results in the formation of $HfO_2$ and $Li_2HfO_3$ in addition to HfC, the oxygen presumably coming from ether cleavage (also a solvent activation).

In another example, in the absence of such carbon donating organic solvents, the reduction of $HfCl_4$ with Na/K (step E) produces alpha-Hf (α-Hf).

In another example, the $MCl_4$ is combined with $AlCl_3$. Co-reduction of $AlCl_3$ and $HfCl_4$ with Li results in mostly HfC and $Al_3Hf$. Aluminum-hafnium alloy nanoparticles can be prepared by reducing a mixture of $HfCl_4$ and $AlCl_3$ in $Et_2O$ with Li and annealing under a flow of hydrogen gas, which removes some of the organic moieties that are attached to the Hf as a result of reaction with the solvent during sonication.

Nanoparticles of group 4B metals synthesized from inorganic precursors via sonochemical solution methods as described above can be subsequently surface passivated with carbohydrates (step F). Analysis of the product black powder materials by SEM, TEM, XRD, BET, and elemental analysis shows that the resulting particles contain a metal core that is encased in a metal-alkoxide gel. In all cases a significant majority of the mass of the material is made up of reactive metal.

2. Alkali Metal Hydride Reduction

Synthesis of Ti, Zr, and Hf nanoparticles can also be accomplished via a multi-step process.

By way of example, in FIG. 2, the initial reaction to produce the amorphous nanoparticles may be via reduction of the respective metal chloride salt ($MCl_4$, where M=Ti, Zr, or Hf) in $Et_2O$ slurry/solution using LiH (e.g., a stoichiometric amount or in excess) as reducing agent while exposed to ultrasound produced by a benchtop ultrasonic cleaning bath under an inert atmosphere. The LiH may be present at from 4-10 mol/mol $MCl_4$, where 4 represents a stoichiometric amount. Exemplary inert gases include argon and nitrogen. Ar may be used rather than $N_2$, to avoid the particles absorbing and activating $N_2$ during the reaction process, thereby avoiding producing nitride impurities in the product. The initial amorphous particle synthesis and filtering (steps G and B) is followed by a high temperature anneal (e.g., from 600° C. to 1000° C., or higher) under vacuum in a highly refractory metal tube (e.g., formed from V, Zr, stainless steel, or Mo). This produced particles of various degrees of crystallinity. Following the annealing process, the particles are washed to remove residual LiH, e.g., with 200 proof (100%) EtOH. This produces a vigorous reaction of the EtOH with the remaining LiH, producing effervescence (which is presumably $H_2$ gas). When the vigorous reaction stops, the container with the EtOH suspension is placed in a benchtop ultrasonic cleaning bath to encourage washing of Li salts out of the particles and break up any macroscopic clumps.

The resulting black powder materials can then be dried under vacuum. The products are shown to be air stable (not pyrophoric), although it is to be expected that there may be some aging in air, resulting in the formation of oxides on the surface, etc. over time. Elemental analyses of the materials shows that the material is substantially (85% or more, e.g., at least 90% or at least 95% reactive metal. The percentage can be improved by optimization of the method. The average particles sizes for all the materials are <10 nm in diameter, as shown by TEM imaging and lack of reflections in the XRD.

Nanoparticles of group 4B metals synthesized from inorganic precursors via sonochemical solution methods as described above can be subsequently surface passivated with carbohydrates (as for step F).

Applications for the exemplary nanopowders include energetic metallization agents for high-energy-density energetic mixtures, for penetrators and projectile weapons, and other energetic devices. For example, the nanoparticles can be used as burn-control agents in rocket propellants. The exemplary nanopowders can also find use as dinitrogen scrubbing materials (e.g., for the semiconductor industry, for example, Ti nanoparticles). They may also be used as precursor materials for the production of metal oxide, metal nitride, metal chalcogenide, metal sulfide, metal phosphide and various other binary or ternary metal compounds. For example, group 4B metal oxide and nitride metal nanoparticles can be formed by oxidization and nitridation of the exemplary nanopowders, respectively. The nanopowders can also be used as components of nanocomposite materials—such as nanothermitics, supported catalysts, and the like. The nanopowders can also be used in metallurgy for the facile manufacture of alloys and intermetallics. Other applications for these materials may be found in tribology and as catalytic additives for fuel cell oxygen reduction catalyst supports (metal oxide precursors). Other applications for the exemplary nanopowders include uses as catalysts, scrubbing materials, precursors for other materials, and the like. In generally, the nanoparticles allow introduction of a reactive metal in a very disperse form. As compared with particulate products formed by grinding and other types of physical comminution, the exemplary nanoparticles have an amorphous character, when initially formed, rendering them metastable, therefore allowing them to be derivatized after they are made.

Without intending to limit the scope of the exemplary embodiment, the following examples illustrate exemplary methods and analysis of the products formed.

EXAMPLES

In the following examples, materials used were as follows:
$HfCl_4$ (98+%, metals basis) was obtained from Strem Chemical, Inc, and used as received.

Lithium powder was obtained by washing the oil out of a lithium dispersion obtained from Alfa Chemical Corp.

LiH (−30 mesh, 95%), LiD (98+ atom % D), and $Et_2O$ (≥99.7%, anhydrous) were obtained from Aldrich and used as received.

Neat $Et_3B$ was obtained from Texas Alkyls and was used without secondary purification or processing.

Analysis of the materials was performed with the following equipment:

The XRD was performed with a Bruker AXS D8 instrument.

DSC/TGA/MS analyses were performed on a Netzsch Jupiter STA449 F1 system equipped with an Aëolos QMS403C quadrupole mass spectrometer.

TEM imaging was performed using a JEOL 2200FS equipped with a Gatan Ultrascan charge coupled device (CCD) camera.

Solid state NMR was performed on a Bruker DMX500 at 11.7 T. Liquid state NMR was performed using a Bruker DMX300 at 7.07 T and a Bruker DMX500 at 11.7 T.

Elemental analyses were performed by Complete Analysis Laboratories, Inc. of Parsippany, N.J.

Example 1

Synthesis of Hafnium Hydride-Carbide Material and Properties

In this example, the sonochemically mediated method for the synthesis of reactive metal nanopowders using a benchtop ultrasonic bath is used for preparation of an air-stable nanopowder containing Hf as the reactive metal in a highly reduced state that is kinetically stabilized against self-ignition in air.

The preparation of amorphous hafnium nanopowder was performed in a solution process by reduction of $HfCl_4$ with LiH in $Et_2O$ in the presence of $Et_3B$ was carried out with the aid of an ultrasonic bath under an inert atmosphere (FIG. 2, step G). Specifically, the synthesis was started in a VAC Atmospheres, Inc. glovebox under an atmosphere of argon. 20 g of $HfCl_4$ powder was mixed with 5 g of LiH powder in a custom-made 800 mL recovery flask with a built-in 10 inch long condenser neck and a Kontes Teflon valve (size 20) with a side-arm for Schlenk technique manipulations. 350 mL of $Et_2O$ were then added to the powder mixture and some bubbling from gas evolution observed, which was presumably due to formation of dihydrogen ($H_2$). The Teflon valve was then closed and the vessel brought outside the glovebox. Using Schlenk technique, the reaction was quickly placed under flowing dry dinitrogen ($N_2$). The flask was then placed in a VWR 50-HT benchtop ultrasonic bath. The reaction was sonicated while the condenser was water-cooled. Within 2 hrs., the temperature of the water in the ultrasonic bath stabilized at 53° C. and the reaction was sonicated while refluxing for 1 h longer. Only a slight darkening of the white slurry was observed at this point. 0.6 mL of triethyl borane ($Et_3B$) was then added to the reaction via a syringe immediately turning the reaction slurry a darker color that initially became brown and eventually, within 15 min of the addition of the $Et_3B$, turned completely black. The reaction product was observed by a change in color of the reaction mixture. The reaction was then sonicated for 2 days and all volatiles removed in vacuo at room temperature. The remaining black powder solids were collected in a glovebox with an Ar atmosphere and shown to have a mass 25.6 g, with the excess mass likely attributable to adsorbed or trapped solvent within the solids.

The filtered reaction product was annealed with a high temperature vacuum heat treatment at 900° C. under vacuum. The anneal was carried out over an 11 hr. period and volatiles were continuously evolved throughout the heating process. Specifically, a 3.4 g batch of the black powder solids was placed into a 0.438" diameter and 3" long vanadium can which was subsequently placed into a 0.50" diameter and 5⅞" long copper can which was subsequently placed into a 25 mm diameter quartz sublimator. The material was heated under dynamic vacuum. The sample emitted some condensable and non-condensable gasses below 200° C., and was kept at this temperature overnight. It was then heated to 500° C. where non-condensables were emitted. The material was heated stepwise with the furnace temperature increased by ~100° C. increments, each time initially evolving non-condensable gas, and the temperature was then be manually increased to the next ~100° C. step when the vacuum reached 50 mTorr. Upon reaching ~700° C., visible white sublimate started depositing on the quartz sublimator above the level of the copper tube. By the time the temperature reached 900° C., volatiles were no longer emitted from the sample. The sample was heated to a final temperature of 900° C. Upon reaching 900° C., the sample was kept at that temperature for 2 h and the furnace was then turned off and the sublimator air cooled to room temperature. 1.5 g of the black powder solids remaining in the bottom of the vanadium can were recovered. The annealing thus resulted in a 56% mass loss, which is consistent with the loss of all the lithium salts (LiCl and excess LiH) via sublimation. The violent reaction of the sublimate on contact with water supports the presence of active lithium species.

After limited or partial air exposure the nanopowder material became air stable, but produced sparking when exposed rapidly to air. A very noticeable production of heat was observed when larger quantities of the material (~1 g) were partially exposed to air; however, the bulk material did not ignite. These observations suggest that the initial air exposure produces surface oxidation of the nanopowder that is not exothermic enough to become a self-propagating combustion, at least when the material is handled in air in smaller quantities (<1 g). This surface oxidation likely produces a protective layer that ultimately makes the material air stable. This kinetic stability and reluctance to ignite can be attributed to the refractory nature of HfC, which probably significantly increases the activation energy for the self-propagating combustion of this material.

By way of comparison, in the absence of ultrasonic irradiation, the white slurry of $HfCl_4$ and LiH in $Et_2O$ does not show any sign of darkening after weeks of stirring.

Analysis
TEM

Figure 3:
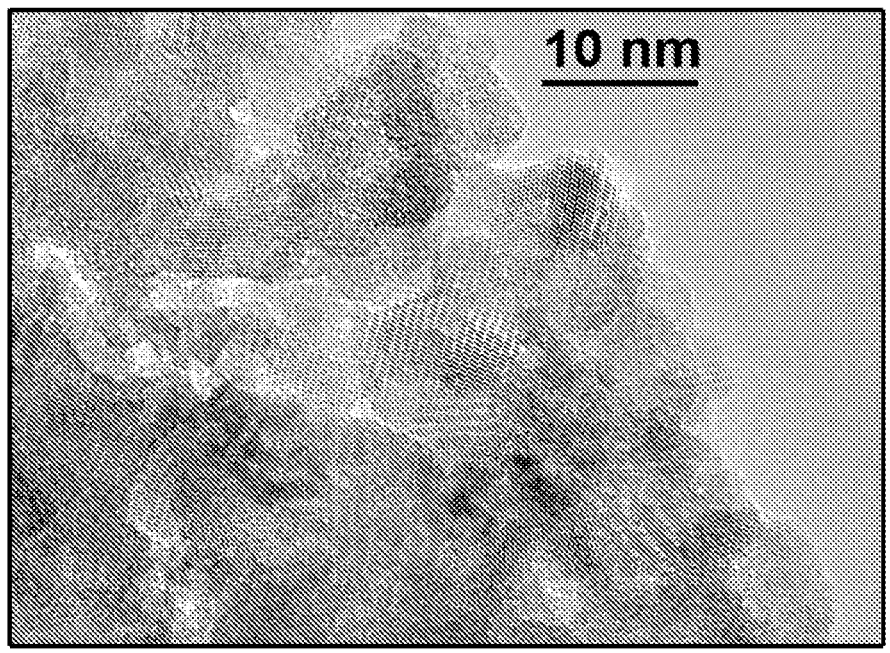
FIG. 3 is an HRTEM micrograph of the Hf-based nanopowder of Example 1 showing 2 to 10 nm crystalline particulates that produce an ED pattern indicative of a mixed hafnium carbide subhydride.

FIG. 3 is an HRTEM micrograph of the amorphous (non-crystalline) nanopowder showing 2 to 10 nm crystalline particulates that produce an ED pattern indicative of a mixed hafnium carbide subhydride. During annealing, these apparently formed larger agglomerates, producing a highly porous network of connected crystallites. The HRTEM studies revealed an intricate nano-scale morphology consisting of 2-10 nm crystallites that sintered into larger agglomerates several tens of nanometers in diameter but are interconnected (see FIG. 3).

The predominant d spacing of the lattice fringes in the micrograph in FIG. 3 is 2.85 Å and 2.44 Å, which is a match for the 2.84 Å and 2.43 Å of pure hafnium. Based on all other evidence the presence of α-Hf in this sample in any significant amount is unlikely; therefore, the lattice fringe match to α-Hf is likely due to e-beam damage of the sample which converted hafnium hydride into elemental hafnium.

Figure 5:
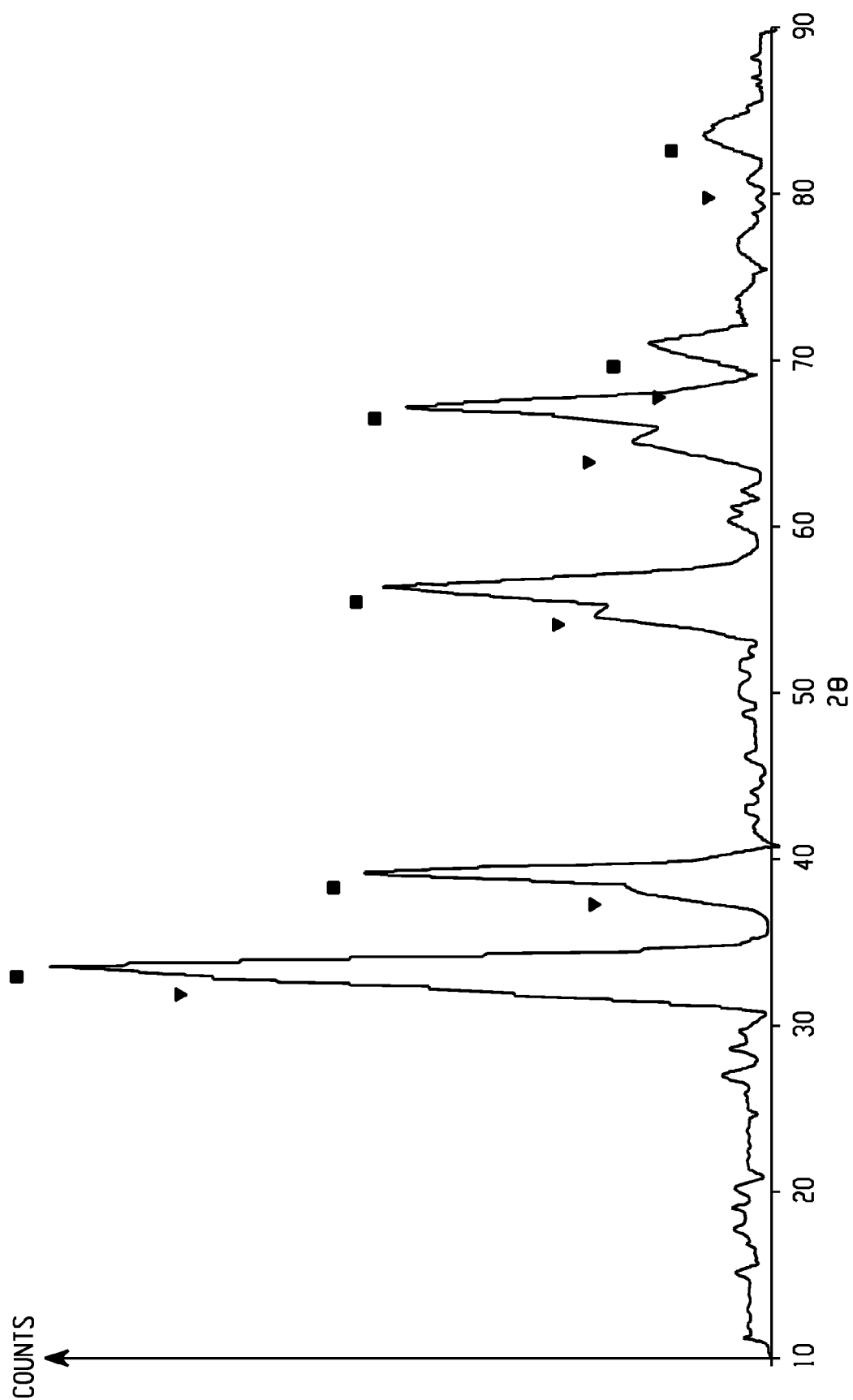
FIG. 5 shows XRD spectrum of the nanopowder of Example 1 showing a cubic lattice nearly identical to HfC (■) and another separate cubic pattern with a unit cell of a= 4.7840 (▼)

FIG. 5 shows a TEM image of the annealed (vacuum heat treated) nanopowder showing larger agglomerates that are dozens of nanometers in diameter. The nanopowder was not imaged by SEM at magnifications greater than 8000 times, due to blurring from surface charging. Although hafnium, hafnium carbide, and hafnium hydride are metallic conductors, there is no bulk conductivity in the nanopowder, which is likely due to surface oxidation. There also seems to be a significant amount of amorphous material that binds the crystalline domains together. This has produced areas with higher and lower density of particles in the nanopowder, with the micrograph in FIG. 5 showing the thicker and thinner regions, with some larger agglomerates measuring 50 nm in diameter.

XRD

Figure 4:
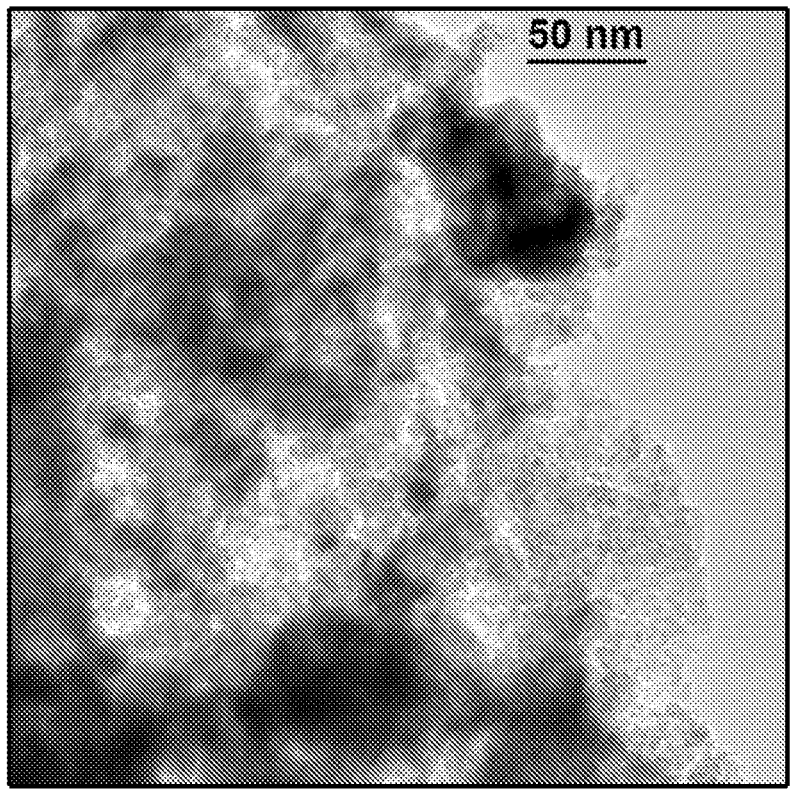
FIG. 4 is a TEM image of the nanopowder of Example 1 showing larger agglomerates that are dozens of nanometers in diameter.

FIG. 4 shows an XRD spectrum of the annealed Hf nanopowder. The XRD pattern shows the presence of two separate FCC phases: a cubic lattice nearly identical to HfC (■) and another separate cubic pattern with a unit cell of a=4.7840 (▼). The most intense peak pattern correlates to 15-18 nm size cubic HfC crystallites. The cubic diffraction pattern with a=4.7840, which is 0.148 Å larger, and the corresponding line widths, are attributable to 12 to 14 nm crystallites. This second diffraction pattern likely arises from greater amounts of hydride, as also supported by TEM electron diffraction analysis. The XRD analysis alone is not conclusive, but is suggestive of a HfC-like lattice and a mixture of phases possibly containing hydride.

Chemical Analysis:

All analyses reported herein were performed on the nanopowder in air. Combustion and wet chemical analysis of the annealed nanopowder sample showed C=1.89%; H=0.38%; N<0.02%; Hf=97.32%; Li=0.11%; total=99.70%. Assuming that the entirety of the remaining 0.30% mass balance is attributable to O, then the elemental makeup of the material is $Hf_{3.47}C_{10.0}H_{2.40}Li_{0.10}O_{0.12}$, likely associating almost every Hf atom with at least one atom of C, H, or O. Chloride was not detected; however, oxygen was detected by EDS.

EDS

Figure 6:
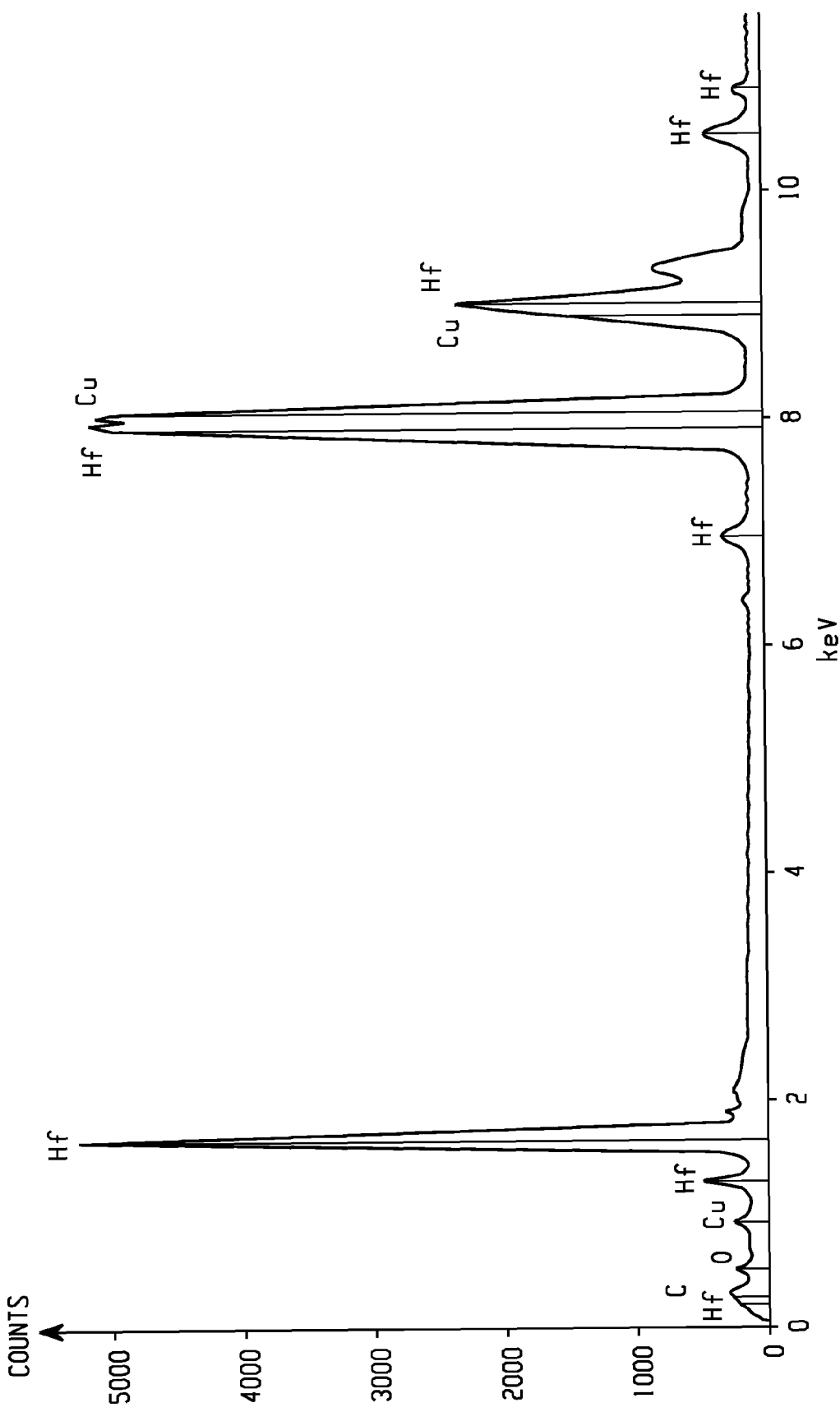
FIG. 6 is a sample EDS spectrum of the nanopowder of Example 1 showing Hf as the prevalent signal, and some C and O, along with the Cu from the TEM grid.

FIG. 6 is a sample EDS spectrum of the nanopowder showing Hf as the prevalent signal, and some C and O, along with the Cu from the TEM grid. The EDS spectrum of the nanopowder is dominated by Hf emissions; however, depending on the irradiated location, the C and O signals varied, confirming the heterogeneity of the elemental C and O distribution.

The presence of O in the EDS obtained during TEM studies, and the relatively low 0.30% mass balance remainder from elemental analysis, are both evidence of the low amounts of oxygen present. XPS sputtering studies were inconclusive as to the distribution of oxygen throughout the material due to the small size of the particles and agglomeration, producing variability in the results.

NMR

Figure 7:
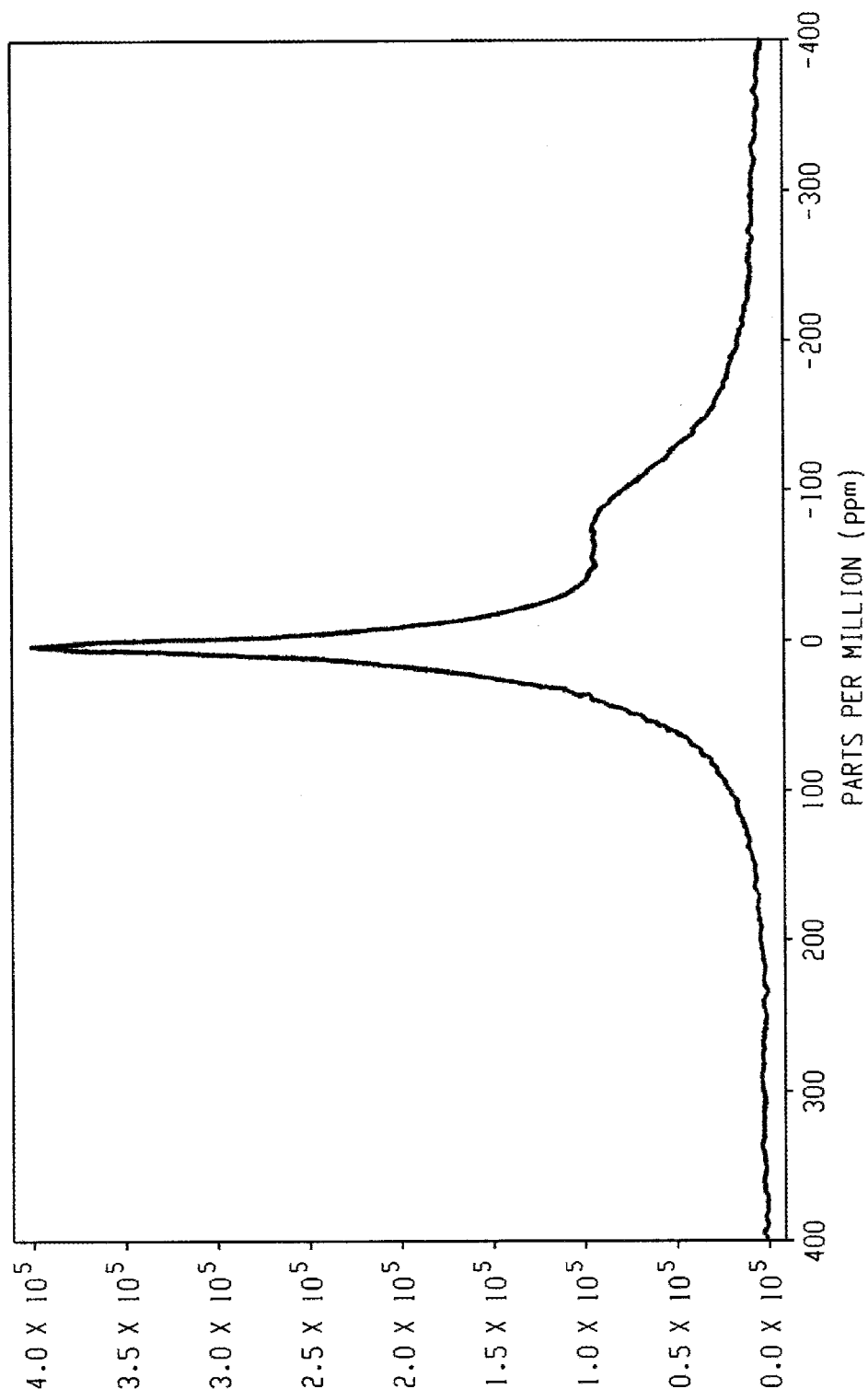
FIG. 7 is an $^1H$ MAS NMR of the nanopowder of Example 1.
Figure 8:
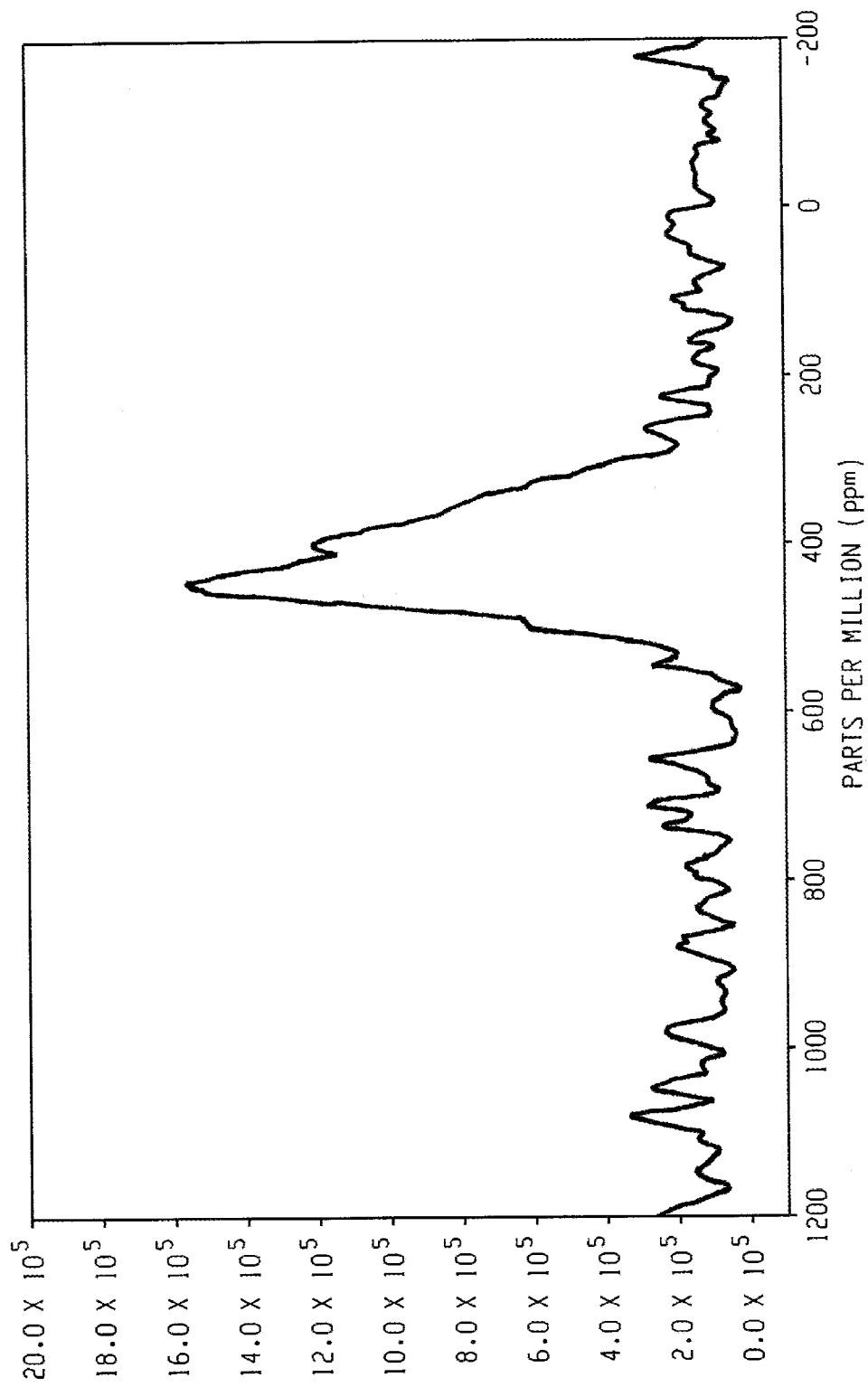
FIG. 8 is a $^{13}C$ solid state NMR of the nanopowder of Example 1.
Figure 9:
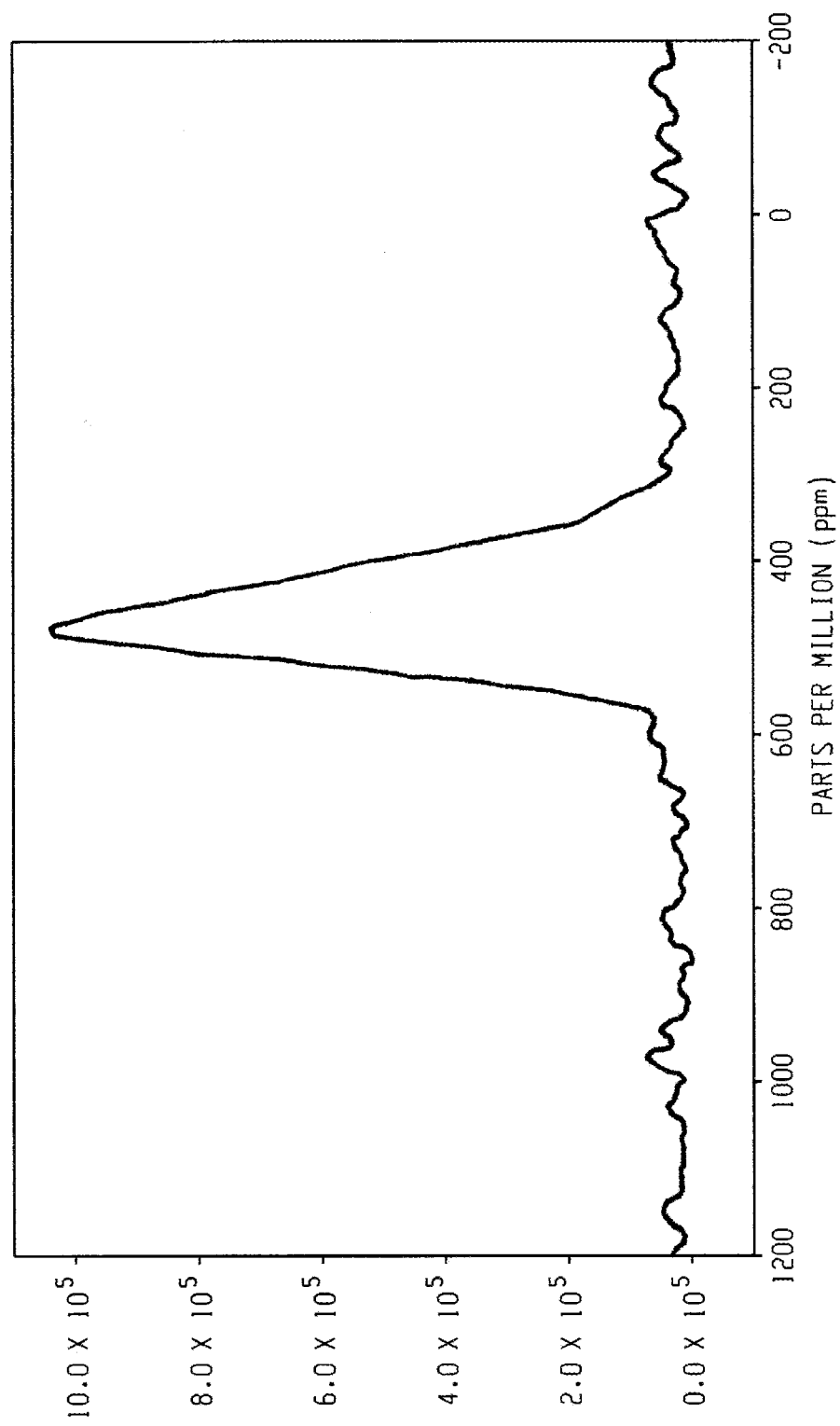
FIG. 9 is a $^{13}C$ solid state NMR of commercially available 350 mesh HfC.

The nature of the C and H within the sample was studied by solid state $^1$H and $^{13}$C NMR. FIG. 7 is an $^1$H MAS NMR of the annealed nanopowder and FIG. 8 is a $^{13}$C solid state NMR of nanopowder. By comparison, FIG. 9 is a $^{13}$C solid state NMR of 350 mesh HfC from Aldrich.

The $^1$H signal for the Example 1 product is very broad, with a line width of 50 kHz, while the $^{13}$C signal has a line width of 18 kHz and a chemical shift of 440 ppm relative to adamantane, both of which are close to the 18 kHz and 472 ppm of a commercial HfC sample (purchased from Aldrich). The $^1$H NMR signal integration for FIG. 7 gave 0.27 mmol of $^1$H for 99.7 mg of the nanopowder, which corresponds to a 0.27% H by mass, and is in good agreement with the 0.38% H content obtained by combustion analysis.

Volatiles Analysis

To study the identity of volatiles released during the vacuum anneal of the sample, volatiles were collected in traps at —196° C. in 2 fractions—fraction (1) below 285° C. and fraction (2) from 285° C. to 714° C. (there were none, or very little condensables at higher temperatures). $^1$H NMR in $C_6D_6$ of fraction (1) revealed predominantly a spectrum of $Et_2O$ with minor peaks attributable to unidentified alkyl resonances, likely arising from decomposition of $Et_2O$. The $^1$H NMR of fraction (2) had $Et_2O$ as a minor signal and a much greater variety of decomposition products.

TGA/DSC/MS Analysis

Figure 10:
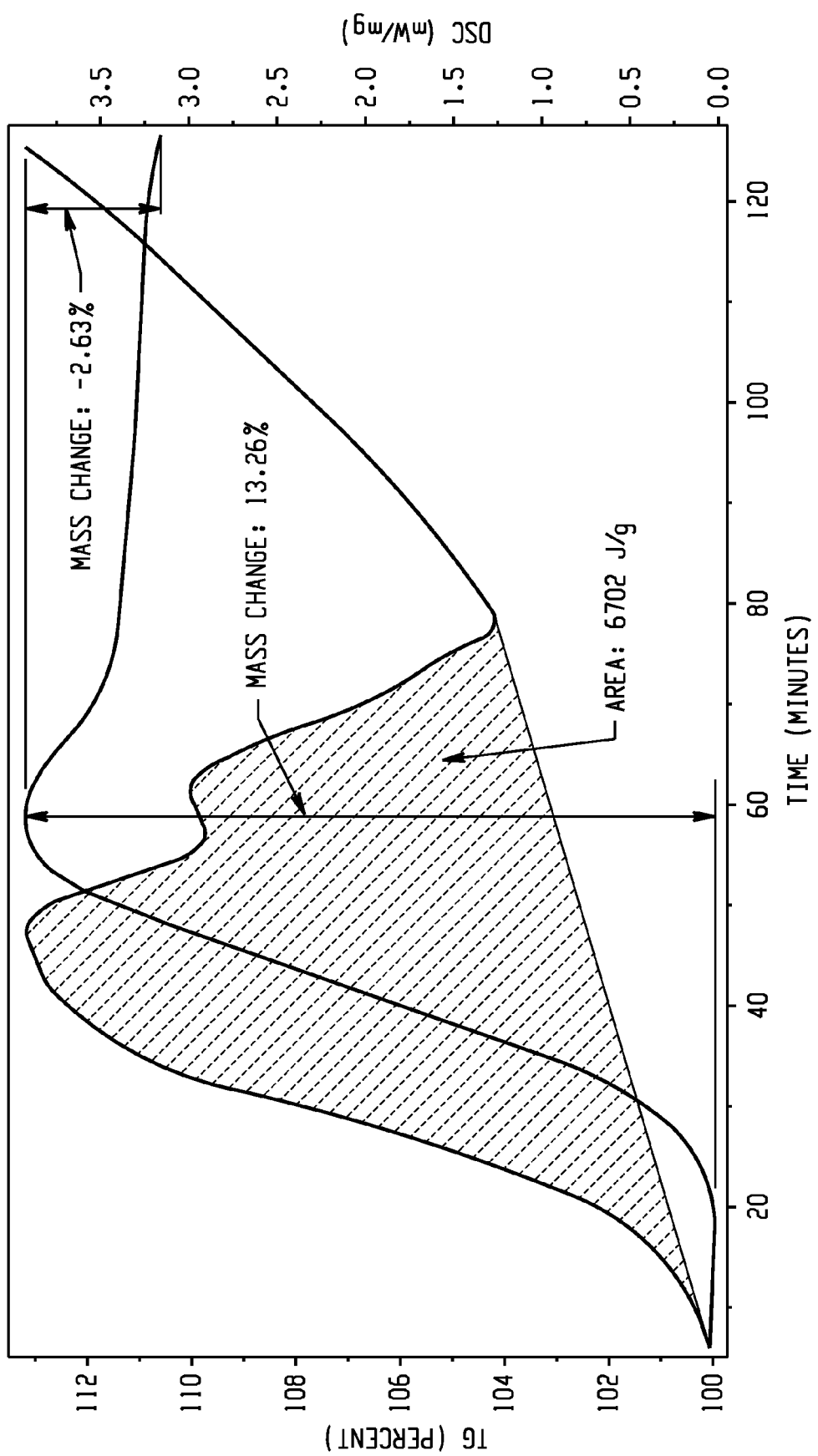
FIG. 10 is a TGA/DSC of the nanopowder of Example 1 in 60:40 $O_2$:Ar at 10° C./min 40° C.-1250° C.: the curve showing the mass change is the TGA plot and the curve with an area marked is the DSC plot.
Figure 11:
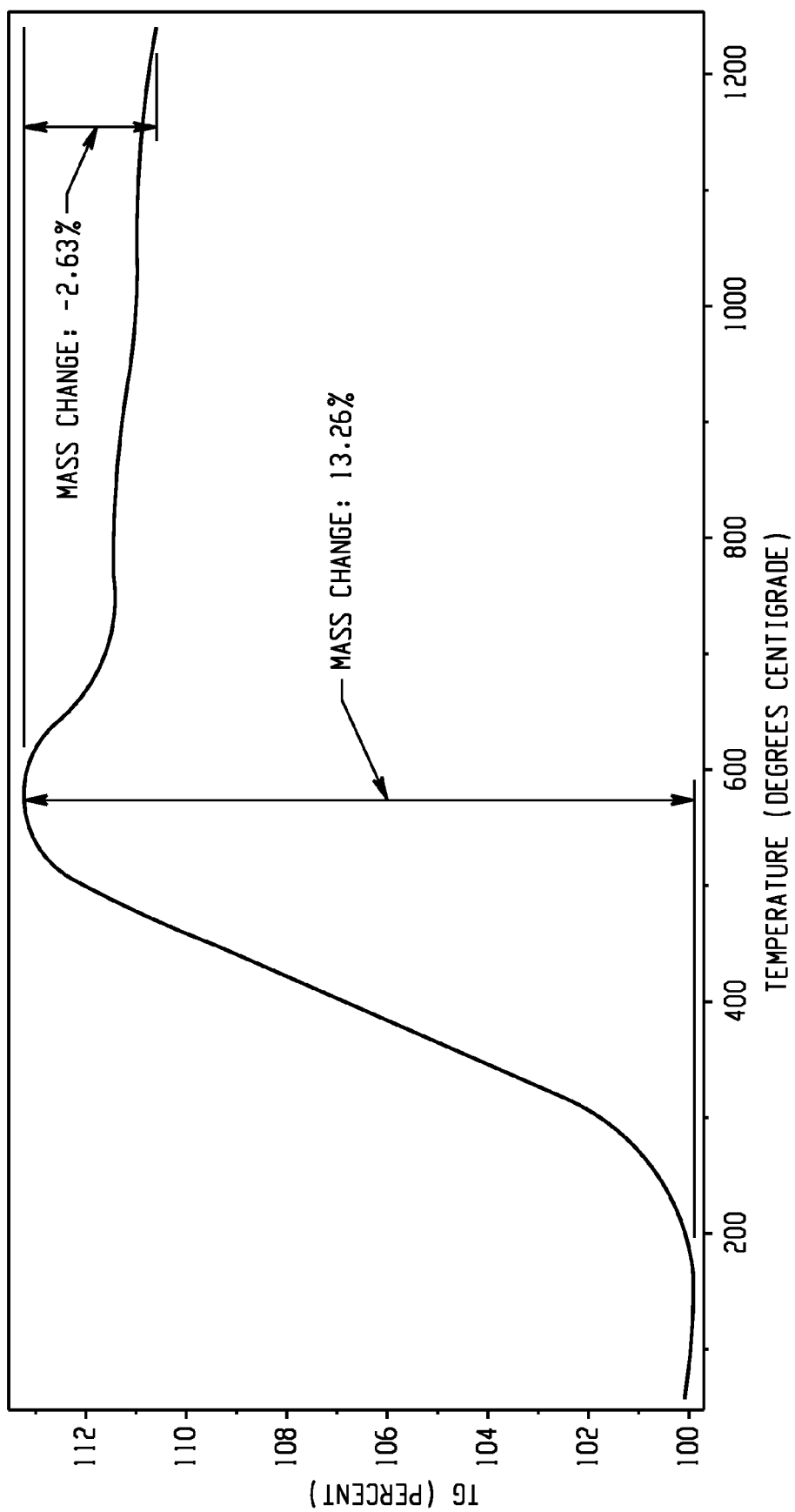
FIG. 11 is a TGA of the nanopowder of Example 1 in 60:40 $O_2$:Ar at 10° C./min 40° C.-1250° C.

TGA/DSC/MS analysis of oxidation of samples of the annealed nanopowder was conducted in a 60:40 $O_2$:Ar atmosphere from 40° C. to 1250° C. FIG. 10 is a TGA/DSC of the nanopowder in 60:40 $O_2$:Ar at 10° C./min 40° C.-1250° C. and FIG. 11 is a TGA of the nanopowder in 60:40 $O_2$:Ar at 10° C./min 40° C.-1250° C. (X-axis temperature domain).

Figure 12:
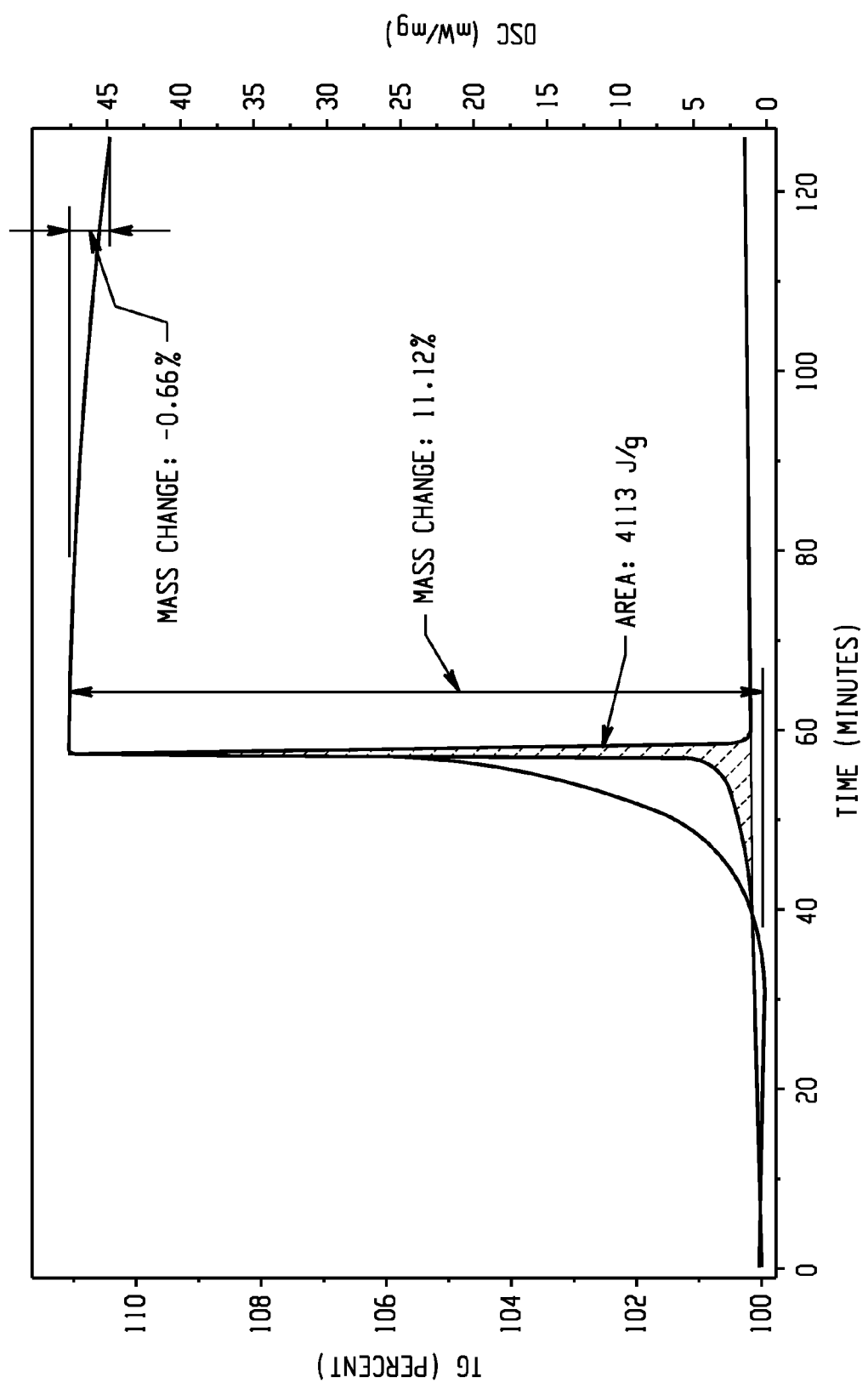
FIG. 12 is a TGA/DSC of commercial 350 mesh HfC 60:40 O$_2$:Ar at 10° C./min 40° C.-1250° C. (X-axis time domain)
Figure 13:
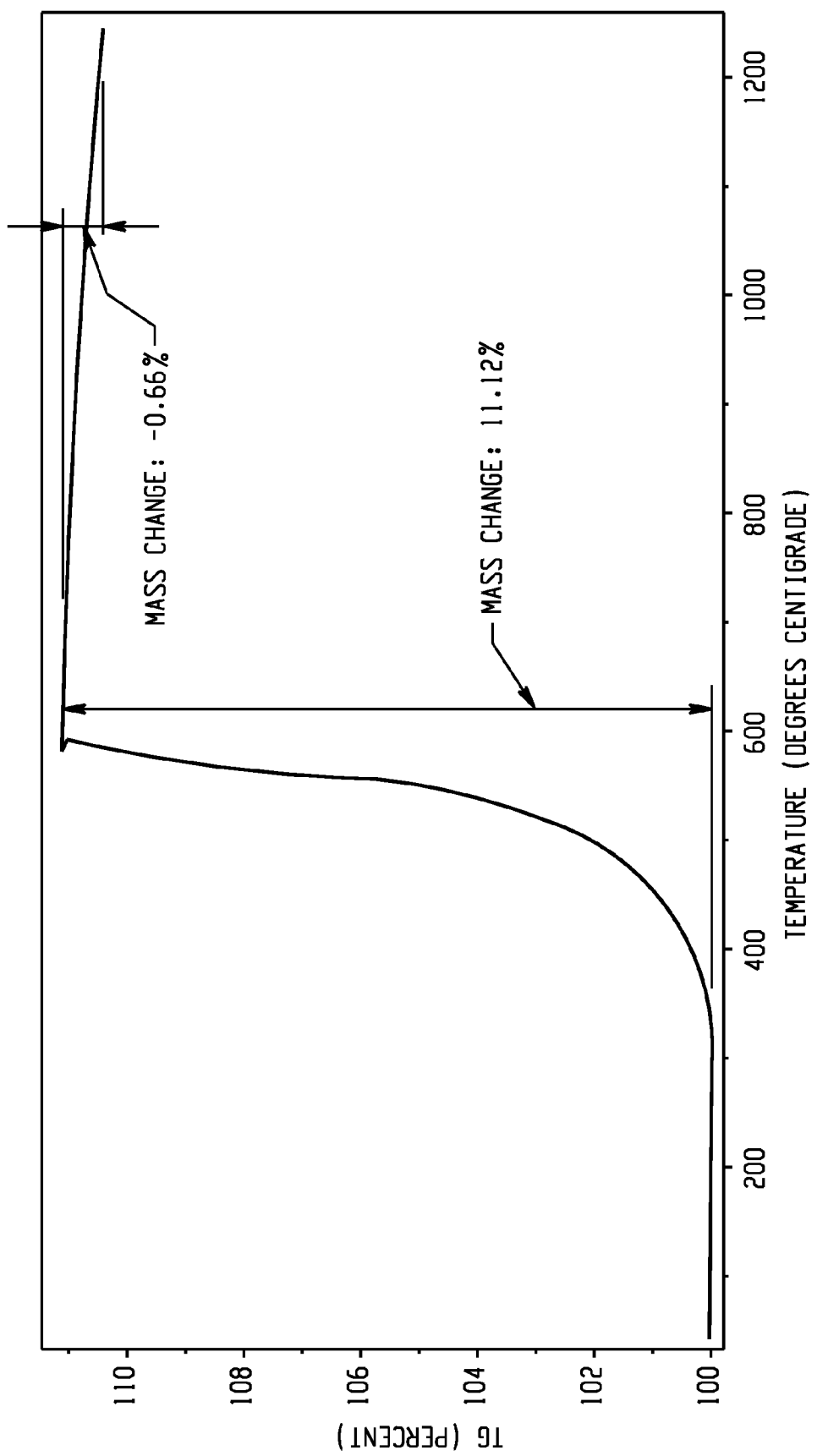
FIG. 13 is a TGA of 350 mesh HfC in 60:40 O$_2$:Ar at 10° C./min 40° C.-1250° C. (X-axis temperature domain)

For comparison purposes, the commercial 350 mesh HfC sample was also analyzed. FIG. 12 is a TGA/DSC of the 350 mesh HfC in 60:40 $O_2$:Ar at 10° C./min 40° C.-1250° C. (X-axis time domain). FIG. 13 is a TGA of 350 mesh commercial HfC from Aldrich in 60:40 $O_2$:Ar at 10° C./min 40° C.-1250° C. (X-axis temperature domain). The onset of combustion in the commercial 350 mesh HfC sample was relatively rapid, with oxidation starting at 300° C., becoming self-driving at about 550° C., and finishing at about 600° C. having a steep slope and producing an 11% mass gain and an exotherm of 4.1 kJ/g. After the completion of combustion in the commercial sample, a gradual mass loss was observed from 600° C. to 1250° C. of ~0.6%.

In comparison, the subcarbide subhydride nanopowder produced in Example 1 started oxidizing below 200° C., and completed oxidation at just over 550° C. gaining ~13% mass and producing 6.7 kJ/g, with a significantly shallower slope not exhibiting any signs of self-propagation. In addition, the combustion peak in the DSC curve for the nanopowder sample of Example 1 (FIG. 10) was noticeably broader than the commercial sample (FIG. 12) and appears to be bimodal due to a multi-phase process. Due to the timing of the $H_2O$ signal in the MS trace appearing in conjunction with the first (major) DSC peak (FIG. 10), and the $CO_2$ emissions coinciding with the second peak, the hydride combustion can be assigned to the lower temperature reaction, and the carbide to the higher. The mass loss for the exemplary nanopowder sample at temperatures greater than 550° C. was much more rapid, and by 1250° C. totaled >2.6%. The mass loss at higher temperatures is likely due to the conversion of $HfO_2$ to HfO, which is more stable at higher temperatures.

Oxygen loss at higher temperatures is significantly more rapid in the nanopowder sample of Example 1 than for the commercial carbide, likely due to the nanoparticle size of the product $HfO_2$. Gravimetric analysis of the samples in air after reaching 1250° C. did not show much $O_2$ re-uptake. This may have been due to the slow O loss in the commercial HfC sample, namely, the large particle size and slow atom diffusion in the solid state due to sintering of the nanoparticles during the oxygen loss process.

Electron Diffraction

Figure 14:
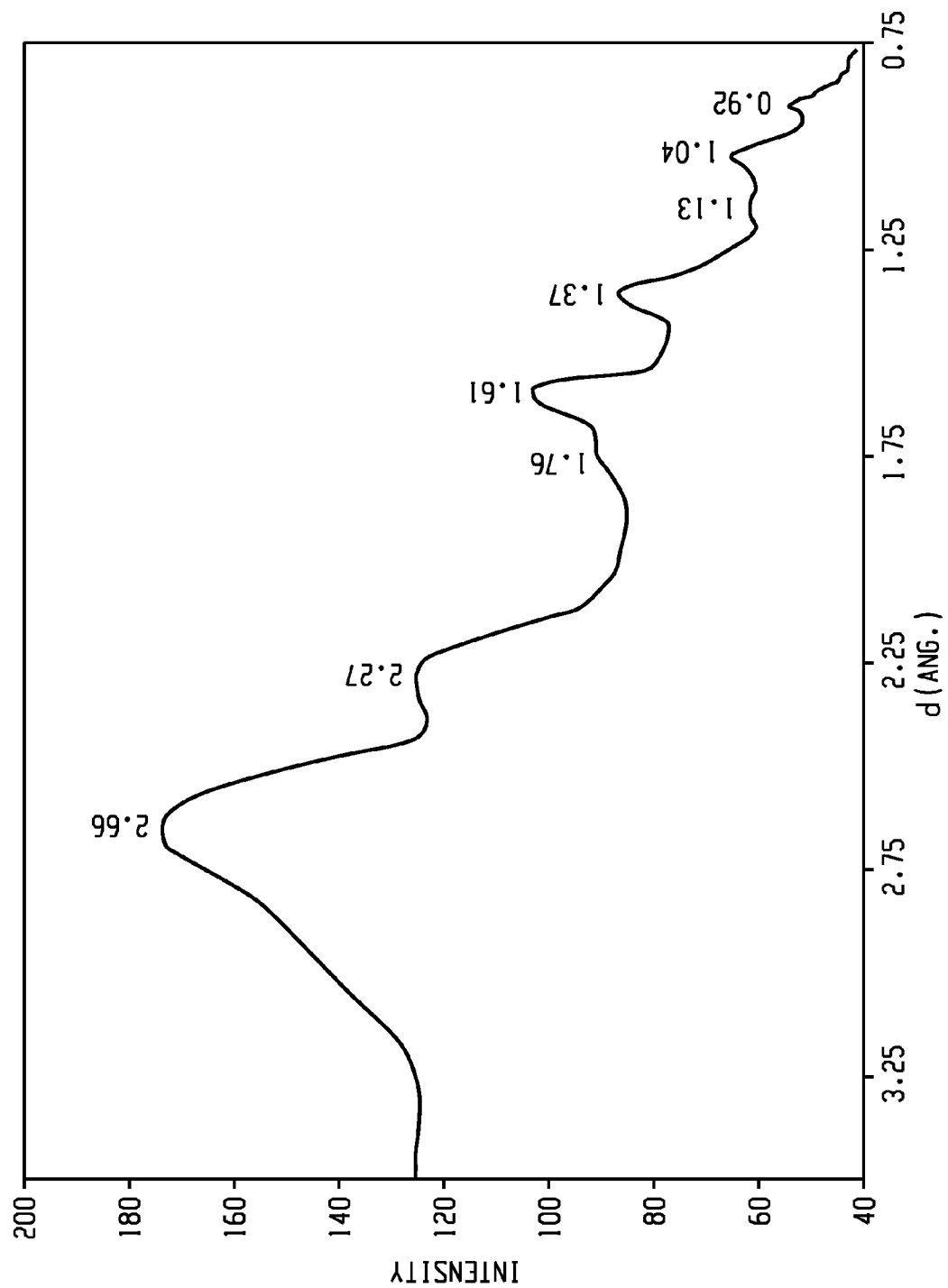
FIG. 14 is a electron diffraction pattern from a TEM micrograph of the annealed nanopowder of Example 1.

An electron diffraction pattern from a TEM micrograph of the annealed nanopowder is shown in FIG. 14. This is consistent with an FCC structure. The electron diffraction (ED) from this sample is in good agreement with the XRD results, and like the XRD, also shows the presence of multiple FCC phases. The dominant phase matches sub-stoichiometric HfC lattice parameters. (i.e., $HfC_{0.67}$, a=4.62). There are also some known sub-stoichiometric hydrides, such as $HfH_{1.7}$ for which a=4.708. These ED data are consistent with a mixed hafnium subcarbide subhydride with some microphase separation due to some regions being more C rich, and others more H rich.

Based on the results obtained, it appears that the product morphology is most likely controlled by the sonochemically mediated reaction of $HfCl_4$ and LiH in solution. Because both of the reactants are poorly soluble in $Et_2O$, the addition of $Et_3B$ likely speeds up the reaction by producing a reactive intermediate. The product hydride also has little or no solubility in $Et_2O$ which, along with the violent sonochemical environment, limits the size of the product particles. The hafnium subcarbide subhydride nanopowder is indefinitely air-stable and produces 6.7 kJ/g when oxidized by $O_2$ (such as during combustion).

Example 2

Hafnium and Hafnium Subcarbide Materials by Alkali Metal Reduction

Hafnium tetrachloride (and tetrabromide) was reduced by various alkali metals in a variety of solvents, using sonication to activate the reaction. The hafnium-based nanopowders prepared using the different solvents and reducing agents are shown below in TABLE 1.

Sodium-potassium alloy was obtained by combining equal weights of the metals and filtering under inert atmosphere.

All reagents were handled in a drybox under an Ar atmosphere. All solvents were distilled from Na/K or Na+OCPh$_2$-.

The reactions produced brown to black solids that were transformed into Hf nanopowders by heat treatment. In each case, the alkali metal(s) was/were added to a mixture of $HfCl_4$ and the solvent in a Pyrex™ bulb in the drybox. The Kontes valve on the bulb was then inserted and closed. The bulb was then sonicated in an ordinary sonic cleaning bath. All reactions of Li powder with $HfCl_4$ in $Et_2O$ were vigorous, and were allowed to die down for at least 30 minutes before the bulb was closed and removed from the drybox. After sonicating 1-5 days, the product mixture was filtered in the drybox, and the dried solids were put into a stainless steel or a copper tube which was inserted into a quartz tube and attached to a vacuum line. After all volatile materials were removed at room temperature, the tube was heated slowly. Typically, a large amount of gas evolution occurred up to 300° C., and some episodic emission of non-condensible gases occurred around 600° C. The condensible products were trapped and analyzed, in some cases. In all heat treatments above 900° C., the alkali metal halide salts sublimed, and the Hf nanopowder was easily removed from the metal tube in the drybox. XRD powder patterns were obtained using an inert atmosphere sample holder. The reactions and their results are listed in TABLE 1, where:

(LP)=low power sonicator bath; (HP)=high power sonicator bath.

*Sonicated for 3 days prior to adding $Et_3B$, then another 3 days.

Eutectic=24% KCl, 43% LiCl, 33% NaCl.

TABLE 1

Hafnium Chloride reductions with alkali metals - reaction conditions and results

| Example | $HfCl_4$ (g) | Alkali (g) | Solvent | Sonication days (type) | Anneal (° C.), time, hrs | Result | Yield |
|---|---|---|---|---|---|---|---|
| A | 2.02 | 0.17 | $Et_2O$/HMTA | 3 d (LP) | 780, 1 h | amorphous | |
| B | 2.00 | 0.17 Li | $Et_2O$ | 2 d (LP) | 900-928, 2 h | $HfC_x$, α-Hf | 1.1 g (>95%) |
| C | 1.50 | 0.13 Li | $Et_2O$ | 3 d (HP) | 900, 2 h | $HfC_x$ | |
| D | 2.04, +0.60 $MgCl_2$ | 0.27 Li | $Et_2O$ | 3 d (LP) | 900-940, 3 h | $HfC_x$, $HfO_2$ | |
| E | 1.99, +$AlCl_3$ 0.87 | 0.32 Li | $Et_2O$ | 5 d (LP) | 900-920, 2 h | $HfC_x$, $Al_3Hf$ | |
| F | 2.00 | 0.36 Li | $Et_2O$ | 2 d (LP) | 900-970 4 h | $HfC_x$, $HfO_2$, $Li_2HfO_3$ | |
| G | 2.00 | 1.00 Na/K | $Et_2O$ | 4 d (LP) | 980, 3 h | $HfC_x$ | 1.18 g (100%) |
| H | 2.00 | 1.10 Na/K | PhMe | 3 d (LP) | 950-970, 4.5 h | $HfC_x$ | 1.23 g |
| I | 2.36 | 1.10 Na/K | PhMe | 2 d (LP) | 1.9 g 1000° C./$H_2$ | $HfC_x$ | 0.67 g |
| J | 2.07 | 0.195 Li | PhMe | 3 d (LP) | 900, 2 h | $HfC_x$ | |
| K | 2.50 | 1.30 Na/K | eutectic | 350-950° C. no sonication | 960-1040, 3 h | α-Hf | 0.15 g |
| L | 2.46 | 1.25 Na/K | $C_7H_{16}$ | 3 d (LP) | 960-1000, 3 h | α-Hf, $HfC_x$ | 0.68 g (50%) |
| M | 2.00 | 1.00 Na/K | $NEt_3$ | 4 d (LP) | 900-950 3.5 h | $HfC_x$ | 1.159 g (97%) |
| N | 3.25 | 0.31 Li | $C_5H_{12}$ | 2 d (LP) | 900, 2 h | α-Hf, $HfC_x$ | 1.7 g (94%) |
| O | 10.15 | 0.91 Li | $C_5H_{12}$ | 2 d (LP) | 625, 15 h | h-$HfC_x$, α-Hf | 5.39 g (95%) |
| P | 2.00 | 0.17 Li | $C_7H_{16}$ | 2 d (LP) | 900, 2 h | α-Hf, $HfC_x$ | (80%) |
| Q1-5 | 5.00 | 0.43 Li | $C_5H_{12}$ | 5 d (LP) | various 500-900 | $HfC_x$, α-Hf, h-$HfC_x$ | |
| R | 2.00 | 0.17 Li | $NEt_3$ | 4 d (HP) | 900, 2 h | $HfC_xN_y$ | (82%) |
| S | 1.50 $HfBr_4$ | 0.084 Li | $Et_2O$ | 5 d (LP) | 0.2 g, 900, 1.5 h | $HfC_x$, $HfO_2$ | 0.1022 g |
| T | 40.00 | 5.55 LiH | $Et_2O$ | 3 d/3 d $Et_3B$ (LP)* | 900, 8 h | h-$HfC_xH_y$, α-Hf | 19.85 g (89%) |
| U | 1.5 | 0.54 Na/K | $Et_2O$ | 3 d (HP) | 900, 2 h | $HfC_x$ | |

Only the reactions of Li with $HfCl_4$ or $HfBr_4$ (Examples A-F and S) in ether proceeded at an appreciable rate in the absence of sonication.

Cleavage of the ether to produce oxides occurred when Li was used as the reducing agent, and increased when an excess of Li was used (Example F), or when bromide was used instead of chloride (Example S).

Reductions in toluene (PhMe) using Na/K produced only $HfC_x$ after annealing (Example H). An elemental analysis of a typical product resulted in an empirical formula $HfC_{0.72}H_{0.13}Na_{0.11}K_{0.007}$ which shows that some alkali metal is retained in the product, probably as a Na salt of a Hf carbide.

The one sample which was annealed under $H_2$ (Example I) was loaded into a makeshift Mo boat prepared from Mo foil which was inserted into a quartz tube lined with a stainless steel tube and Mo foil. The tube was inserted into a tube furnace, evacuated, and backfilled with $H_2$, which was then allowed to flow at a low rate and vented through a bubbler to prevent back diffusion. The $H_2$ was passed through a scrubber to remove oxygen and water prior to introduction into the system. The furnace was heated slowly, and held at 100° C. for an hour, 150° C. for 1 h, 200° C. for 1.5 h, 250° C. for 17 h, 400° C. for 3 h, 600° C. for 1 h, 950° C. for 2 h, and 1000° C. for 1 h. The resulting powder was later reannealed under vacuum to sublime out the alkali salts.

Reductions using Na/K in $Et_3N$ produced a similar result to the reductions in toluene. The condensible (77K) volatile products were trapped from the anneal with some of these reactions. The reaction in $Et_3N$ (Example M) released $Et_3N$, $C_2H_6$, $C_2H_4$, non-condensibles, and other as yet unidentified volatile products. Reduction in $Et_3N$ using Li incorporated nitride as well as carbide into the product (Example R).

In heptane using Na/K (Example L), very little carbide was formed, but the reaction was far from completion and the linewidths were narrow. Greater completion was achieved with Li powder (Example P) In pentane using Li powder (Examples N, O, and Q), the result was the same as with heptane/Na/K, but the reaction went to near completion. Example O demonstrates nanomaterial synthesis on a 5 gram scale. These reactions in saturated hydrocarbons produced a product with larger crystallites than observed with other solvents after annealing and salt sublimation at comparable temperatures. Anneals at five different temperatures were studied (Examples Q1-Q5), and these showed a gradual transformation into hexagonal α-Hf phases at the lowest temperatures (500° C.) to larger particles and growth of cubic $HfC_x$ at the higher temperatures.

An attempted reduction with Na/K in a LiCl/NaCl/KCl eutectic (Example K) was sluggish and seemed to produce Hf, mostly from vapor phase reaction between the alkali metals and HfCl$_4$ from 350-950° C. This reaction was not sonicated. In the latter case, only α-Hf was produced. Apparently, substantial grain growth occurs during annealing from precursors produced in saturated hydrocarbon solvents, such that the final product is no longer nanoscale.

Analysis

XRD Analysis

The crystallite sizes were determined from the standard Scherrer equation using a sample of ground Si powder to obtain the widths of lines from instrumental broadening alone. The instrumental broadening was subtracted from the experimental linewidths, and half-height peak widths were used.

Figure 15:
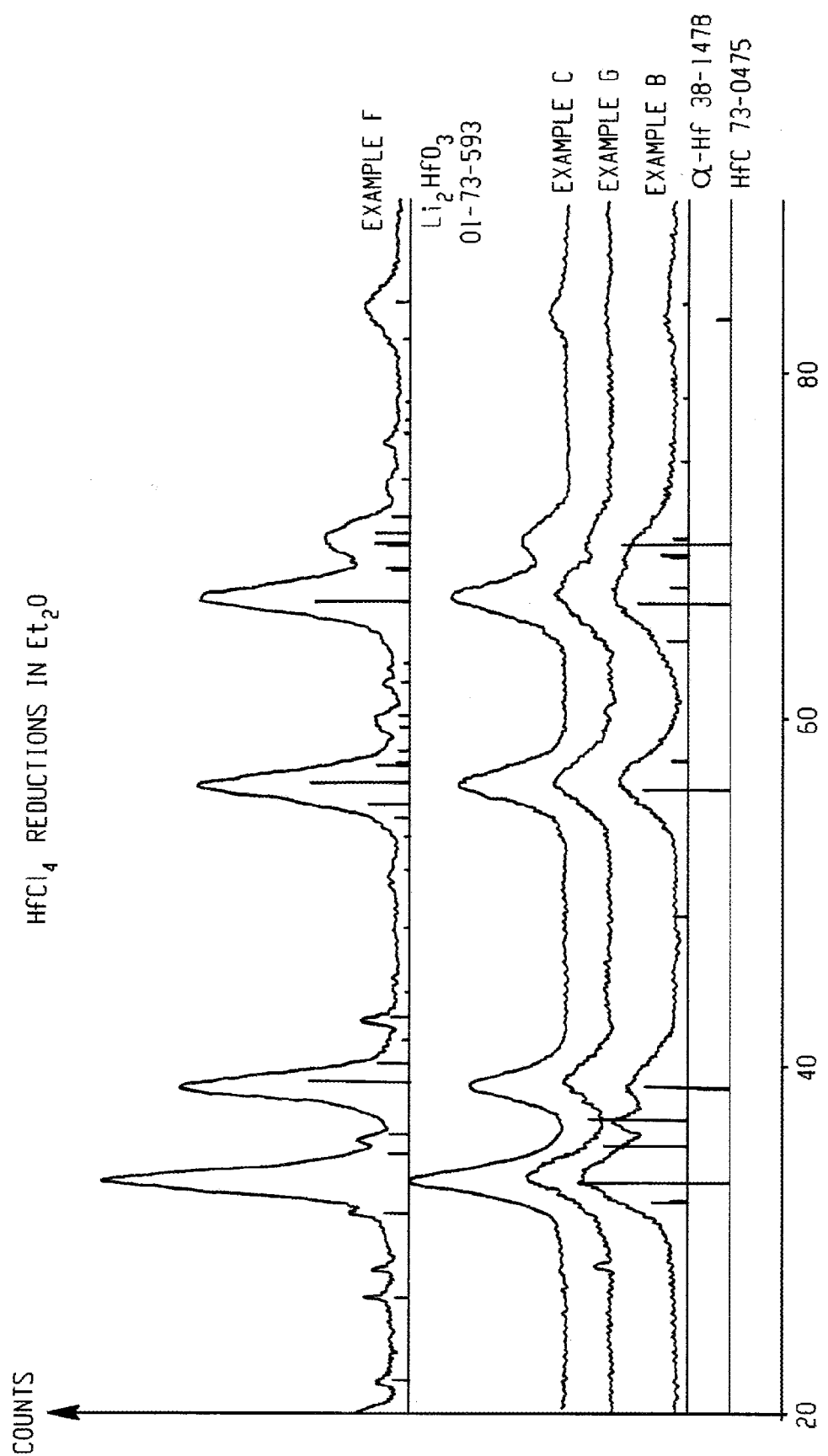
FIG. 15 shows XRD patterns of annealed products of HfCl$_4$ reductions in Et$_2$O with Li and Na/K produced in Examples B, C, F, and G.

XRD peaks corresponding to substoichiometric hafnium carbides were present in all cases where organic solvents were used, which clearly indicates that C—H bond activation takes place. The reduction in diethyl ether using Li and low power sonication produced Hf nanoparticles in addition to HfC$_x$ (Example B). Reductions using Na/K in the same solvent, or Li with high power sonication produced only HfC$_x$ (Examples C and G). The use of excess Li produced HfO$_2$ and Li$_2$HfO$_3$ in addition to HfC$_x$ after annealing (Example F). The XRD of the annealed products of HfCl$_4$ reductions in Et$_2$O with Li and Na/K are shown in FIG. 15. For comparison purposes, XRD for HfC, α-Hf, and Li$_2$HfO$_3$ are also shown.

Figure 16:
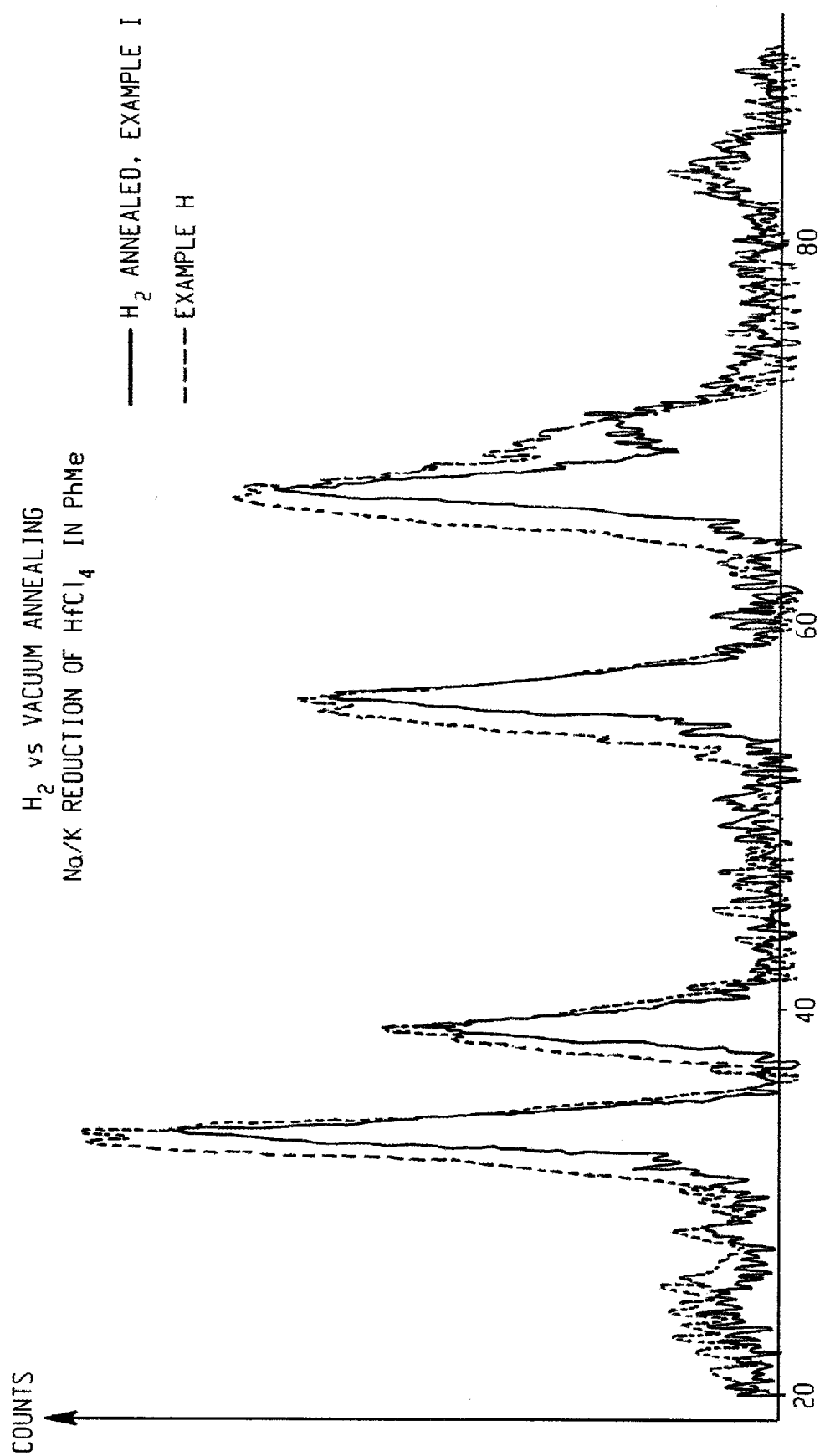
FIG. 16 shows XRD patterns of annealed products of HfCl$_4$ reduction with Na/K in toluene using Na/K produced in Examples H and I.

FIG. 16 shows XRD patterns for reductions in toluene (PhMe) using Na/K (Examples H and I), which produced HfC$_x$ after annealing. The vacuum annealed materials (Example H) clearly have broader lines and therefore smaller crystallite sizes. If the same precursor material from the reduction reaction is annealed under H$_2$ instead of under vacuum (Example I), the XRD peaks become narrower, but are in the same locations. The sample annealed under H$_2$ still retains substantial amounts of salts. Those salts were sublimed out under vacuum, leaving the Hf nanopowder XRD pattern unchanged. As high carbide content probably inhibits crystallite growth due to its extremely refractory nature, it is speculated that this could indicate that some carbon was removed by this H$_2$ treatment procedure, although this has not been confirmed by elemental analysis.

Figure 17:
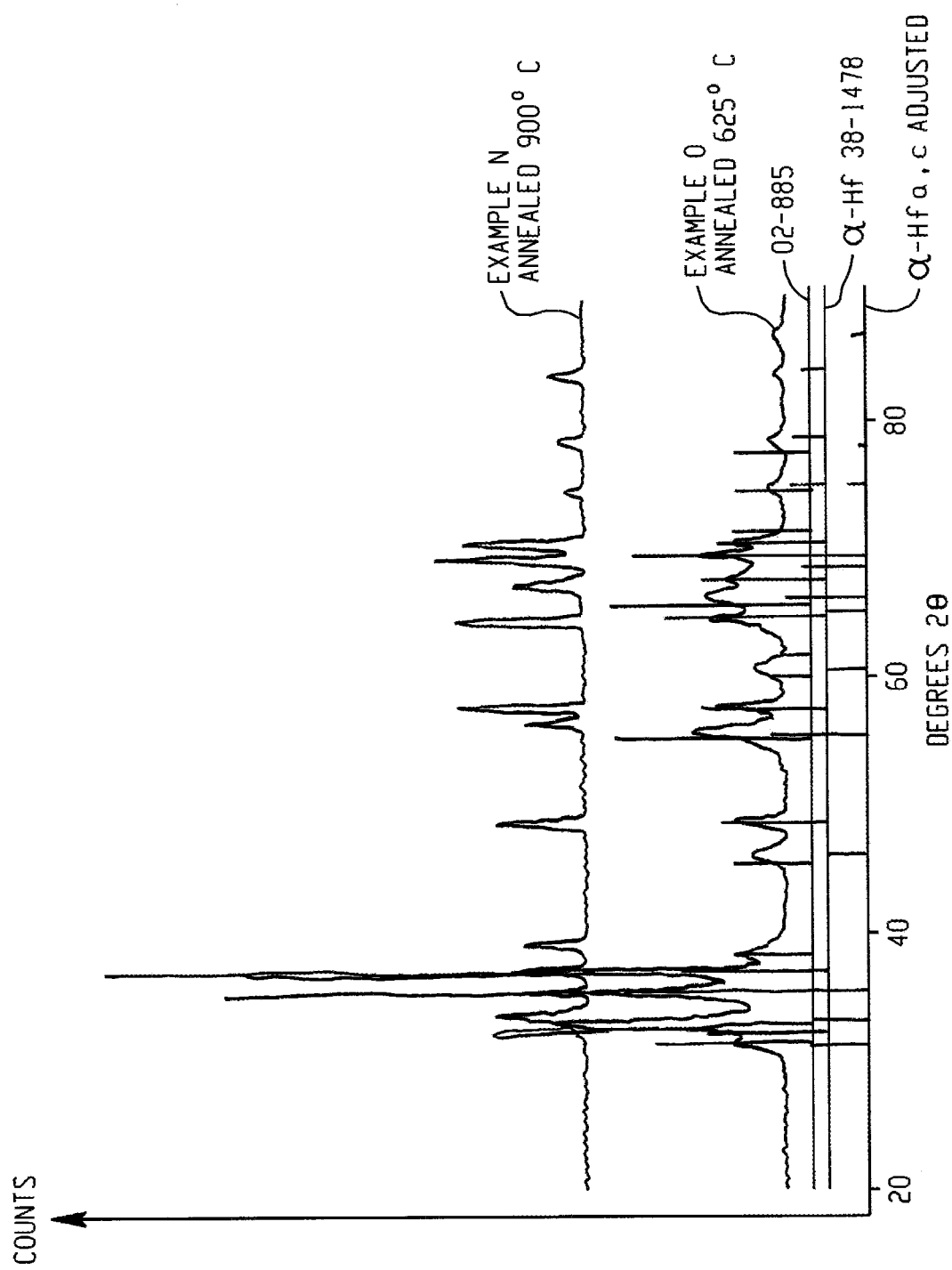
FIG. 17 shows XRD patterns of annealed Hf products made in saturated hydrocarbon and salt solvents (Examples N and O)

FIG. 17 shows XRD patterns of annealed Hf products made in saturated hydrocarbon (Examples N and O). The low temperature annealed material was annealed for the longest time (15 h) and its strongest peaks match a low density hexagonal phase of Hf, which is probably just a low carbon HfC$_x$ with the α-Hf structure. The high temperature annealed sample becomes 255 nm α-Hf and 65 nm cubic HfC$_x$.

Figure 18:
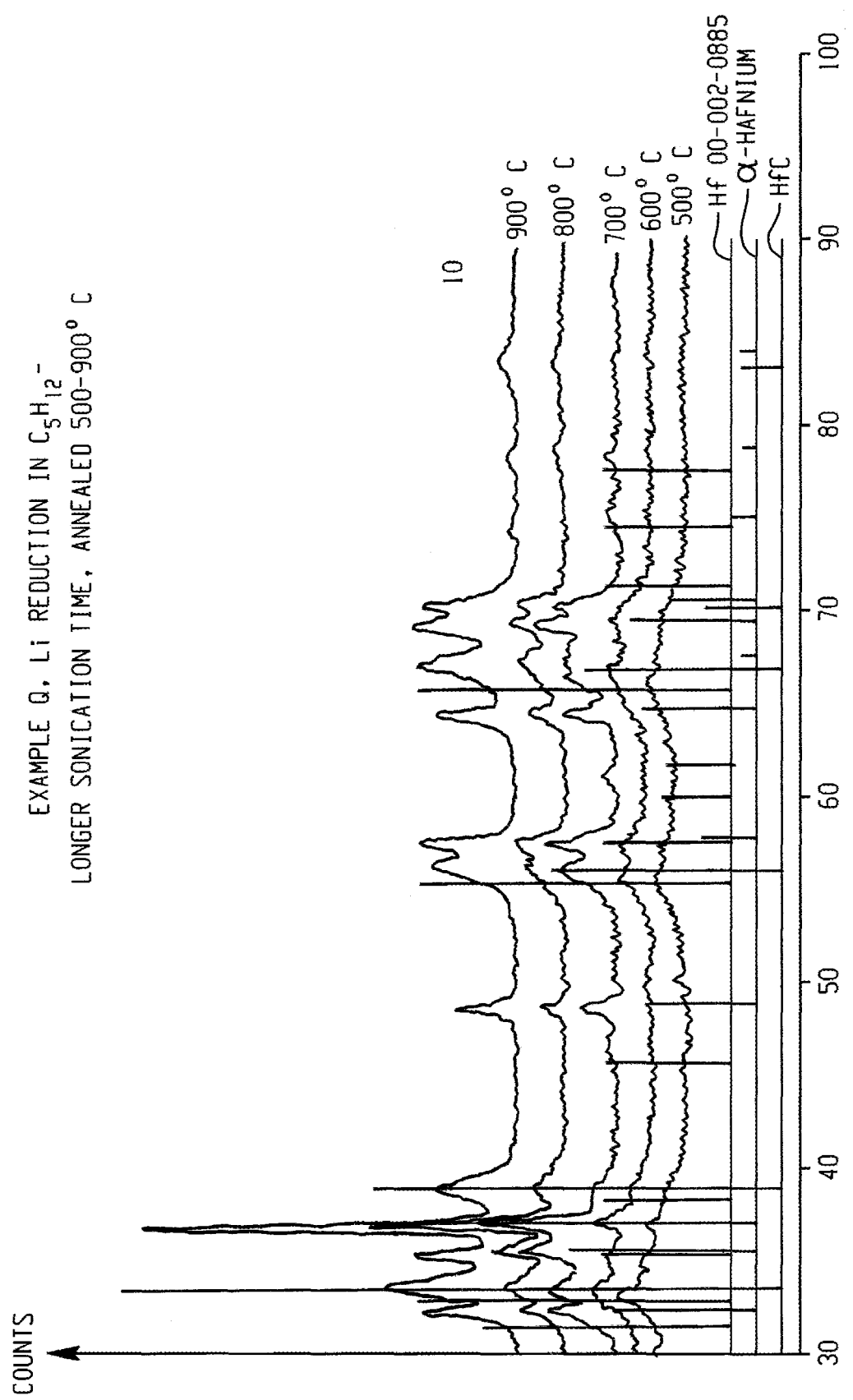
FIG. 18 shows the transformation of Example Q on annealing from 500 to 900° C. in 100° C. increments.

Example Q was sonicated for a longer period of time than the others in the higher power sonicator. FIG. 18 shows the transformation of Example Q on annealing from 500 to 900° C. in 100° C. increments.

TGA/MS

TGA/MS combustion analysis (under O$_2$) was performed on selected products, as shown in Table 2. Many samples had a substantial mass loss (below starting mass) after an initial mass gain, which is unexpected as HfO$_2$ and HfO should not sublime at temperatures up to 1300° C. In many cases, the amount of mass loss exceeded the expected loss for the combustion of carbide. The only gas released was CO$_2$, except in the case of Example R, which produced NO as well.

TABLE 2

Summary of TGA data

| Example | TG max value (%) | TG ending value (%) | Area under DSC curve (to 850° C.) (kJ/g) |
|---|---|---|---|
| C | 102.2 | 100.1 | 5.3 |
| G | 103.3 | 93.3 | 5.2 |
| H | 104.8 | 88.8 | 8.7 |
| J | 104.3 | 95.6 | 6.6 |
| N | 115.5 | 114.9 | 6.4 |
| O | 116.3 | 114.3 | 7.9 |
| P | 115.0 | 110.5 | 7.1 |
| Q1 (500° C.) | 100.7 | 94.0 | 2.8 |
| Q2 (600° C.) | 101.4 | 93.4 | 3.3 |
| Q3 (700° C.) | 106.0 | 104.8 | 5.6 |
| Q4 (800° C.) | 102.3 | 102.0 | 4.6 |
| Q5 (900° C.) | 110.0 | 108.8 | 8.1 |
| R | 106.1 | 94.7 | 5.3 |
| S | 103.5 | 99.9 | 5.5 |

Figure 19:
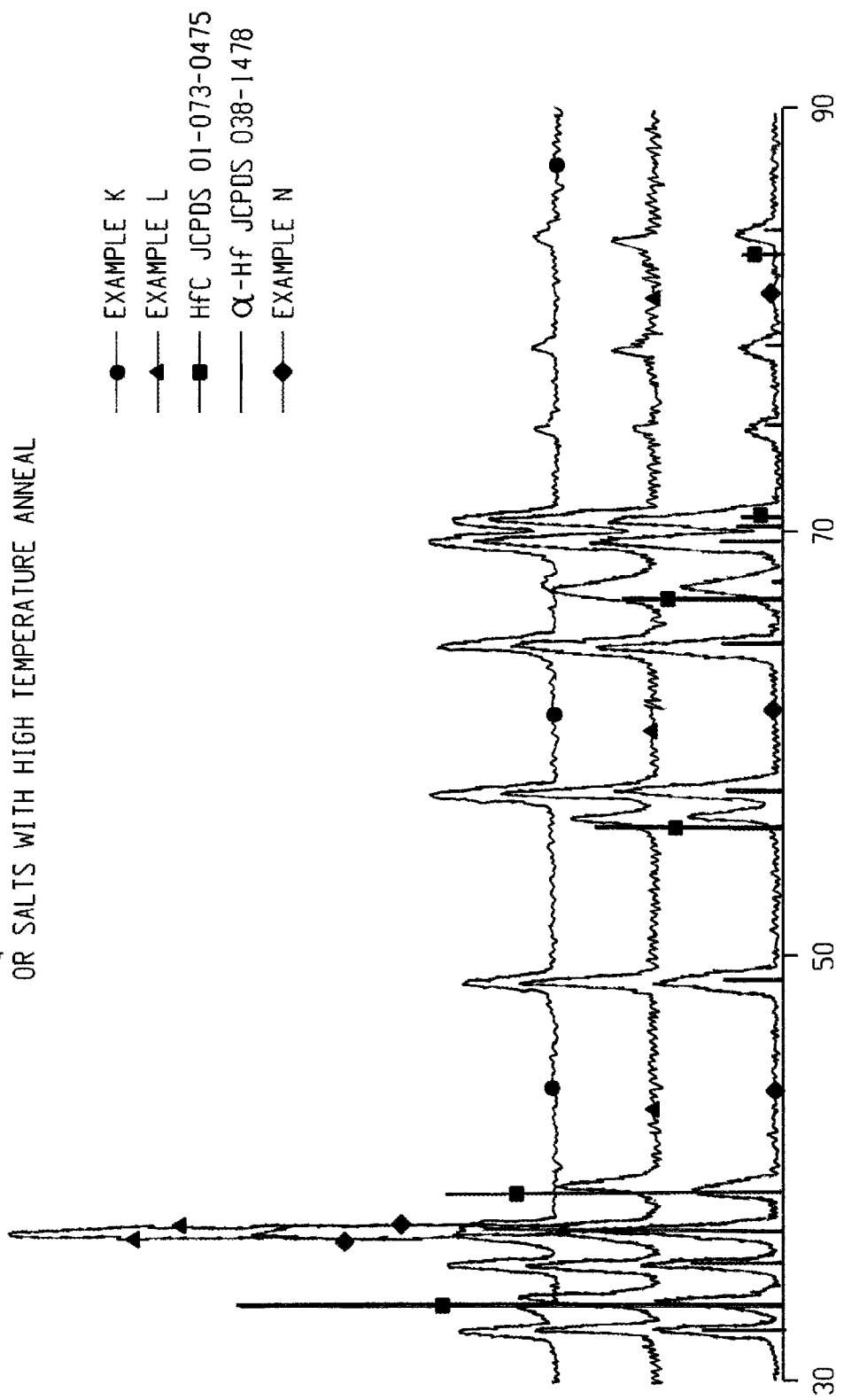
FIG. 19 shows XRD patterns for high temperature annealed material from examples K, L, and N.

In heptane using Na/K (Example L), very little carbide was formed, but the reaction was far from completion and the linewidths were narrow. In pentane using Li powder (Examples N, O, and Q), the result was the same as with heptane/Na/K, but the reaction went to completion. These reactions in saturated hydrocarbons produced a product with large crystallites after higher temperature annealing and salt sublimation. An attempted reduction with Na/K in a LiCl/NaCl/KCl eutectic was sluggish and seemed to produce Hf, mostly from vapor phase reaction between the alkali metals and HfCl$_4$ from 350-950° C. In the latter case, only α-Hf was produced, as no source of carbon was present. Apparently, substantial grain growth occurs during high temperature annealing from precursors produced in saturated hydrocarbon solvents, such that the final product is no longer nanoscale. FIG. 19 shows XRD patterns for high temperature annealed material from Examples K, L, and N.

Figure 20:
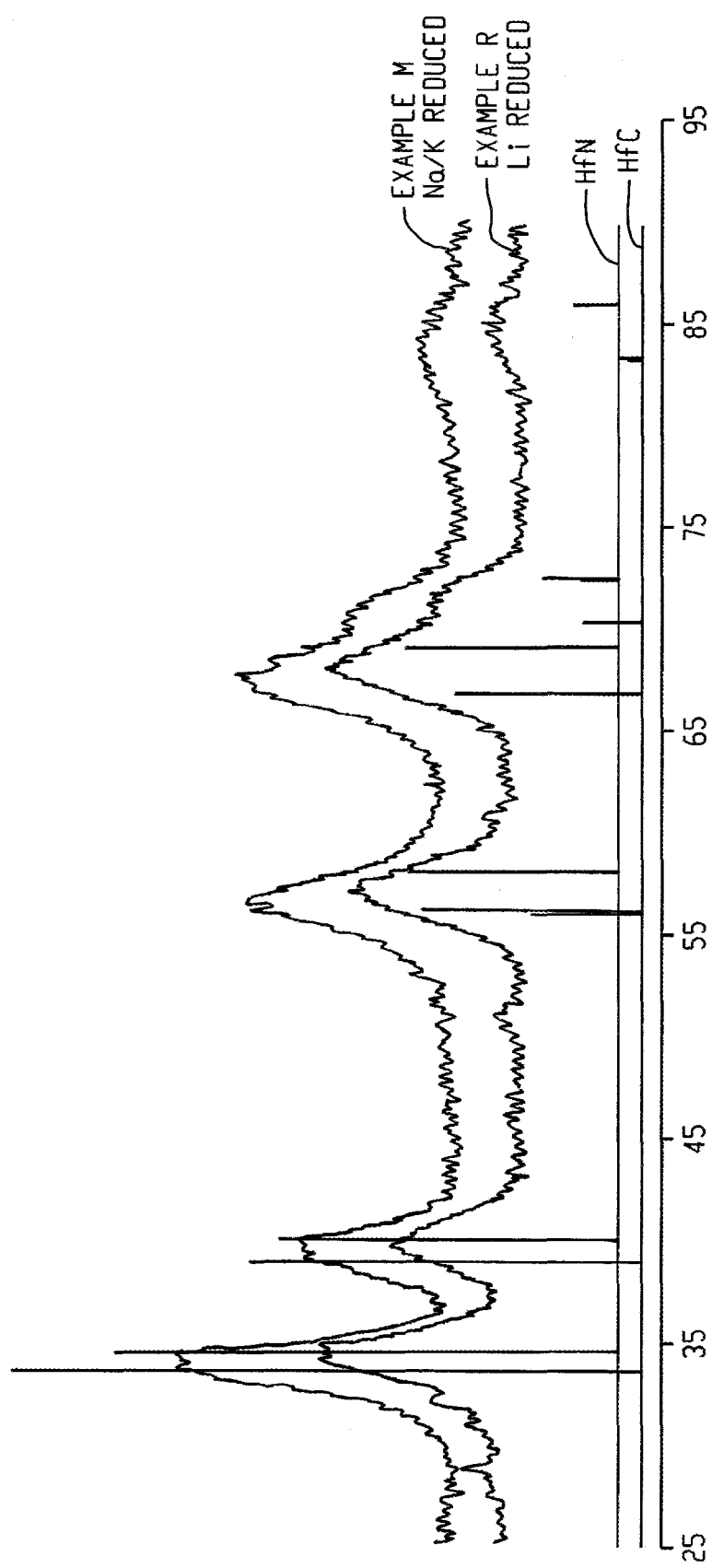
FIG. 20 shows the XRD pattern from Examples M and R for reduction of HfCl$_4$ in Et$_3$N.

When Et$_3$N is used as solvent with a Na/K reducing agent, HfC$_x$ is produced after annealing. However, when Li powder is used, reaction with nitrogen occurs, and HfC$_x$N$_y$ is formed on annealing. FIG. 20 shows the XRD pattern from examples M and R. The presence of N causes a noticeable shift in the d-spacing, consistent with the larger unit cell size of HfN.

TEM

Figure 21:
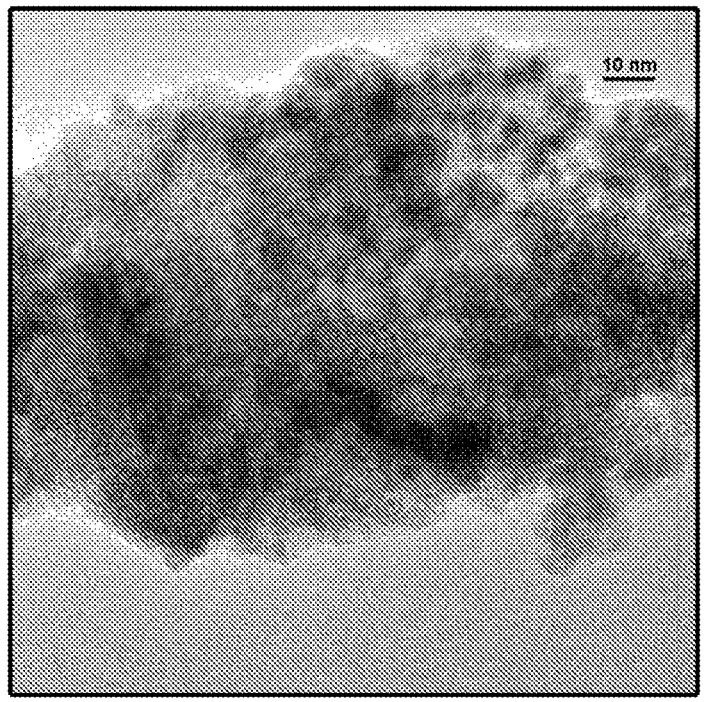
FIG. 21 is a TEM of an Hf nanopowder (Example B)
Figure 22:
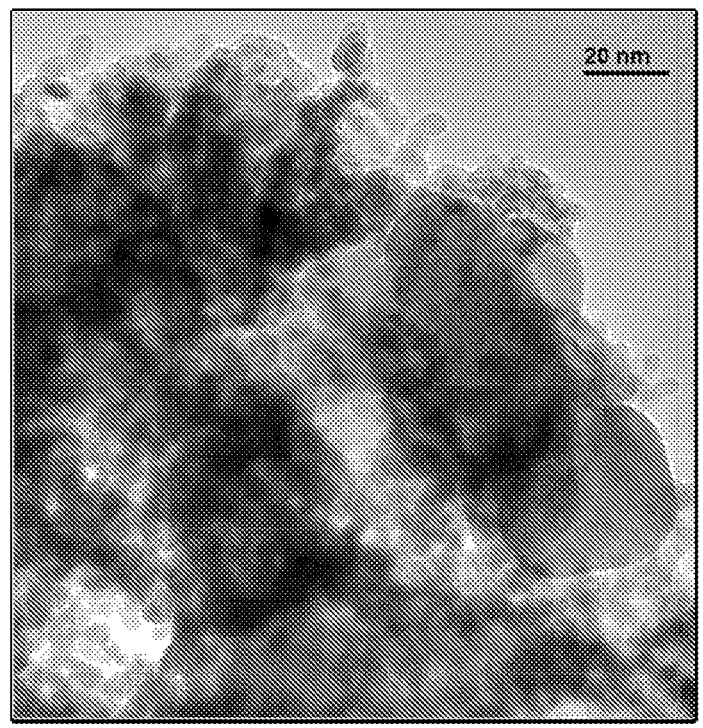
FIG. 22 is a TEM image of an Hf nanopowder (Example C)

TEM studies were done on two of the samples. The product of Example B, which has some of the smallest particles, is shown in FIG. 21. There is some crystalline material embedded in amorphous material. The sample made with the presence of MgCl$_2$ and an excess of Li, (Example D), contains 5-7 nm particles and 30-50 nm crystallites particles embedded in the smaller nanoparticle networks (FIG. 22). This description is consistent with the XRD data that shows 6.6 nm HfC$_x$ and 38 nm HfO$_2$.

$^{13}$C Solid State NMR

Figure 23:
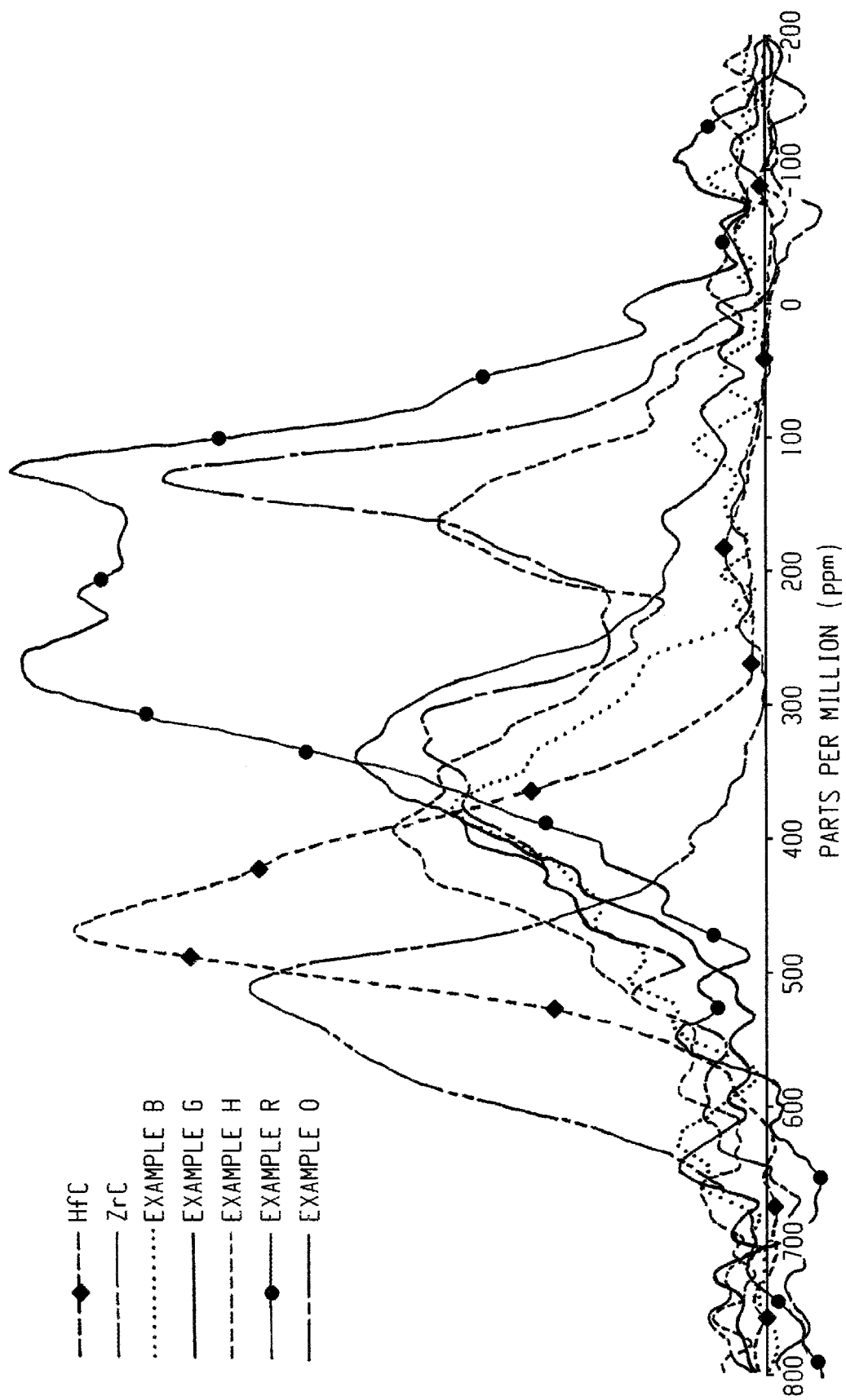
FIG. 23 shows $^{13}$C Solid State NMR for selected samples.

Selected samples of the nanopowders were sealed in 5 mm pyrex tubes about 40 mm long and placed in a horizontal coil in a solid state probe. Samples were not spun. A spin echo sequence was used to get sufficient sensitivity and bandwidth excitation. FIG. 23 shows spectra for selected samples. The commercial, 1.5 micron sized, HfC and ZrC samples show only highly Knight shifted peaks (indicating a metallic conductor) as do the exemplary materials from high temperature annealed materials that used Et$_2$O solvent and Li or Na/K as reducing agents (examples B and G). However the Knight shifts in the exemplary materials are not as large as in the well crystallized commercial samples. The material from Example H, which was reduced in toluene, has a peak for aromatic carbon in addition to the Knight shifted carbide peak. The low temperature annealed material that was reduced in pentane (Example O) also shows a sharp peak for olefinic or aromatic carbon. The material from Li reduction in amine solvent (Example R) shows the greatest variety of carbon peaks, covering the broadest ppm range from aliphatic to aromatic to Knight shifted carbide.

A summary of analytical data on final products of the reactions obtained is indicated in Tables 3 and 4.

TABLE 3

Crystallite sizes determined by XRD and electron microscopy

| Example | Annealing ° C. (time, hours) | Crystallite Size by XRD (nm) | | | | SEM/TEM |
|---|---|---|---|---|---|---|
| | | α-Hf | HfC$_x$ | hex-HfC$_x$ | Other | |
| B | 928 (2 h) | 8 | 3 | | | 3-10 nm |
| C | 900 (2 h) | | 5.9 | | | |
| D | 900-940 (3 h) | | 6.6 | | 38 HfO$_2$ | |
| E | 900-920 (2 h) | | 5.8 | | 115 Al$_3$Hf | |
| F | 900-970 (4 h) | | 6.9 | | | |
| G | 980 (3 h) | | 4.2 | | | |
| H | 970 (4.5 h) | | 4.2 | | | |
| I | 1000 (H$_2$flow) | | 6.3 | | | |
| J | 900 (2 h) | | 5.8 | | | |
| K | 960-1040 | large | | | | |
| L | 900 (2 h) | 250 | 80 | | | |
| M | 950 (3.5 h) | | 4.2 | | | |
| N | 900 (2 h) | 255 | 65 | | | |
| O | 625 (17 h) | 71 | | 11 | | 5-75 nm |
| P | 900 (2 h) | 15 | 8.8 | | | |
| Q1 | 500 (3 h) | | 4.1 | | | |
| Q2 | 600 (1.5 h) | 8.4 | | | | |
| Q3 | 700 (16 h) | 32 | | | | |
| Q4 | 800 (2 h) | 32 | 6 | | | |
| Q5 | 900 (2 h) | 39 | 10 | | | |
| R | 900 (2 h) | | | | 3.3 HfN | |
| S | 900 (1.5 h) | | 9.4 | | 47 HfO$_2$ | |
| T | 900 (8 h) | 41 | | 46 | | |
| U | 900 (2 h) | | 3 | | | |

TABLE 4

Elemental analysis data

| Example | XRD | C | H | N | Hf | other |
|---|---|---|---|---|---|---|
| B | 3 nm HfC$_x$; 8 nm α-Hf | 3.24 | 0.53 | 0.68 | 95.44 | |
| C | 5.9 nm HfC | 5.04 | 0.13 | 0.25 | 94.39 | |
| H | 4.2 nm | 4.54 | 0.069 | | 93.68 | Na 1.34, K 0.15 |
| J | 5.8 nm HfC$_x$ | 9.60 | 0.47 | 0.23 | 88.95 | |
| M | 4.2 nm HfC$_x$ | 8.42 | 0.51 | 3.02 | 87.79 | |
| O | 71 nm α-Hf, 11 nm hex-HfC$_x$ | 1.51 | 0.23 | 0.45 | 97.86 | |
| Q3 | 32.3 nm α-Hf | 3.06 | 0.59 | 0.45 | 95.75 | |
| Q4 | 6 nm HfC, 32.3 nm α-Hf | 1.77 | 0.53 | 0.14 | 97.48 | |
| Q5 | 10.2 nm HfC, 38.6 nm α-Hf | 1.75 | 0.17 | 0.16 | 97.79 | |
| R | 3.3 nm HfN | 4.08 | 0.26 | 2.66 | 92.88 | |
| T | 41-46 nm HfC$_x$H$_y$ | 2.43 | 0.44 | 0.24 | 96.76 | |
| U | 3.1 nm HfC | 5.75 | 0.32 | 0.30 | 93.57 | |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of producing nanoparticles comprising: reducing hafnium chloride or zirconium chloride with an alkali hydride or alkali earth metal hydride in a sonically agitated liquid in the presence of a catalytic amount of triethylborane to form metallic nanoparticles comprising said hafnium or zirconium.

2. The method of claim 1, further comprising annealing the nanoparticles.

3. The method of claim 2, wherein the annealing comprises heating the nanoparticles to a temperature of at least 500° C.

4. The method of claim 1, wherein the nanoparticles are amorphous in character and increase in crystallinity upon annealing.

5. The method of claim 1, further comprising heating the nanoparticles to a temperature of at least 100° C.

6. The method of claim 1, wherein the sonic agitation comprises applying ultrasound to the liquid with a frequency of at least 20 KHz.

7. The method of claim 1, wherein the liquid comprises a solvent.

8. The method of claim 7, wherein the solvent is selected from the group consisting of hydrocarbons, ethers, amines, and inorganic salts.

9. The method of claim 8, wherein the solvent comprises a dialkyl ether.

10. The method of claim 7, wherein a carbide of the hafnium or zirconium is formed through reaction with the solvent.

11. The method of claim 1, wherein the nanoparticles comprise a material selected from the group consisting of carbide of the hafnium or zirconium, a hydride of the hafnium or zirconium, and a combination thereof.

12. The method of claim 10, wherein said material non-stoichiometric.

13. The method of claim 1, wherein the nanoparticles have an average size of up to 200 nm.

14. The method of claim 12, wherein the nanoparticles have an average size of up to 20 nm.

15. The method of claim 1 wherein the hafnium or zirconium is co-reduced with a halide of a second metal, wherein the second metal is not a transition element.

16. The method of claim 1, wherein the reductant is present in the liquid at from four to ten times the molar concentration of the transition metal.

17. The method of claim 1, wherein the reducing of the hafnium chloride or zirconium chloride in the sonically agitated liquid is performed under an atmosphere free of oxygen.

18. The method of claim 17 wherein the oxygen-free atmosphere comprises at least one element selected from the group consisting of nitrogen and argon.

* * * * *